United States Patent
Leong et al.

(10) Patent No.: US 10,468,211 B2
(45) Date of Patent: Nov. 5, 2019

(54) ILLUMINATED LOW-TRAVEL KEY MECHANISM FOR A KEYBOARD

(71) Applicant: Apple Inc., Cupertino, CA (US)

(72) Inventors: Craig C. Leong, San Jose, CA (US); Robert Y. Cao, San Francisco, CA (US); Bradford J. Zercoe, Danville, CA (US); Dinesh C. Mathew, San Francisco, CA (US); Bruce E. Berg, Encinas, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/851,355

(22) Filed: Dec. 21, 2017

(65) Prior Publication Data
US 2018/0137996 A1    May 17, 2018

Related U.S. Application Data

(63) Continuation of application No. 15/154,706, filed on May 13, 2016, now Pat. No. 9,997,308.
(Continued)

(51) Int. Cl.
*G06F 3/02* (2006.01)
*H01H 13/705* (2006.01)
(Continued)

(52) U.S. Cl.
CPC ......... *H01H 13/705* (2013.01); *G06F 1/1666* (2013.01); *G06F 3/0202* (2013.01);
(Continued)

(58) Field of Classification Search
CPC ................ H01H 13/14; H01H 13/705; H01H 2227/036; H01H 2237/00; G06F 3/0202
See application file for complete search history.

(56) References Cited

U.S. PATENT DOCUMENTS 3,657,492 A    4/1972    Arndt et al.
3,917,917 A    11/1975    Murata
(Continued)

FOREIGN PATENT DOCUMENTS

CN    2155620    2/1994
CN    2394309    8/2000
(Continued)

OTHER PUBLICATIONS

Elekson, "Reliable and Tested Wearable Electronics Embedment Solutions," http://www.wearable.technology/our-technologies, 3 pages, at least as early as Jan. 6, 2016.
(Continued)

*Primary Examiner* — Vanessa Girardi
(74) *Attorney, Agent, or Firm* — Dorsey & Whitney LLP

(57) ABSTRACT

A key mechanism for an electronic device includes a switch housing and a hinged structure. As one example, the hinged structure can be a butterfly hinge. The switch housing includes switch pin retaining mechanisms on opposing sides of the switch housing. The hinged structure includes two separate wings that are positioned adjacent to each other such that a cavity is formed between the two wings. The two wings are coupled together by coupling elements. The wings of the hinged structure can include switch housing pins on each arm of the wing that extend into the cavity and couple to the switch pin retaining mechanisms in the switch housing. Various configurations of switch pin retaining mechanisms and switch housing pins can be used to attach the hinged structure to the switch housing.

20 Claims, 16 Drawing Sheets

Related U.S. Application Data

(60) Provisional application No. 62/161,103, filed on May 13, 2015.

(51) Int. Cl.
*H01H 13/88* (2006.01)
*H01H 13/10* (2006.01)
*H01H 13/85* (2006.01)
*H01H 13/86* (2006.01)
*G06F 1/16* (2006.01)
*H01H 3/12* (2006.01)

(52) U.S. Cl.
CPC ............ *H01H 13/10* (2013.01); *H01H 13/85* (2013.01); *H01H 13/86* (2013.01); *H01H 13/88* (2013.01); *H01H 3/125* (2013.01)

(56) References Cited

U.S. PATENT DOCUMENTS

| | | |
|---|---|---|
| 3,978,297 A | 8/1976 | Lynn et al. |
| 4,095,066 A | 6/1978 | Harris |
| 4,319,099 A | 3/1982 | Asher |
| 4,349,712 A | 9/1982 | Michalski |
| 4,484,042 A | 11/1984 | Matsui |
| 4,596,905 A | 6/1986 | Fowler |
| 4,598,181 A | 7/1986 | Selby |
| 4,670,084 A | 6/1987 | Durand et al. |
| 4,755,645 A | 7/1988 | Naoki et al. |
| 4,937,408 A | 6/1990 | Hattori et al. |
| 4,987,275 A | 1/1991 | Miller et al. |
| 5,021,638 A | 6/1991 | Nopper et al. |
| 5,092,459 A | 3/1992 | Uljanic et al. |
| 5,136,131 A | 8/1992 | Komaki |
| 5,278,372 A | 1/1994 | Takagi et al. |
| 5,280,146 A | 1/1994 | Inagaki et al. |
| 5,340,955 A | 8/1994 | Calvillo et al. |
| 5,382,762 A | 1/1995 | Mochizuki |
| 5,397,867 A | 3/1995 | Demeo |
| 5,408,060 A | 4/1995 | Muurinen |
| 5,421,659 A | 6/1995 | Liang |
| 5,422,447 A | 6/1995 | Spence |
| 5,457,297 A | 10/1995 | Chen |
| 5,477,430 A | 12/1995 | LaRose et al. |
| 5,481,074 A | 1/1996 | English |
| 5,504,283 A | 4/1996 | Kako et al. |
| 5,512,719 A | 4/1996 | Okada et al. |
| 5,625,532 A | 4/1997 | Sellers |
| 5,804,780 A | 9/1998 | Bartha |
| 5,828,015 A | 10/1998 | Coulon |
| 5,847,337 A | 12/1998 | Chen |
| 5,874,700 A | 2/1999 | Hochgesang |
| 5,876,106 A | 3/1999 | Kordecki et al. |
| 5,878,872 A | 3/1999 | Tsai |
| 5,881,866 A | 3/1999 | Miyajima et al. |
| 5,898,147 A | 4/1999 | Domzaiski et al. |
| 5,924,555 A | 7/1999 | Sadamori et al. |
| 5,935,691 A | 8/1999 | Tsai |
| 5,960,942 A | 10/1999 | Thornton |
| 5,986,227 A | 11/1999 | Hon |
| 6,020,565 A | 2/2000 | Pan |
| 6,068,416 A | 5/2000 | Kumamoto et al. |
| 6,215,420 B1 | 4/2001 | Harrison et al. |
| 6,257,782 B1 | 7/2001 | Maruyama et al. |
| 6,259,046 B1 | 7/2001 | Iwama et al. |
| 6,377,685 B1 | 4/2002 | Krishnan |
| 6,388,219 B2 | 5/2002 | Hsu et al. |
| 6,423,918 B1 | 7/2002 | King et al. |
| 6,482,032 B1 | 11/2002 | Szu et al. |
| 6,530,283 B2 | 3/2003 | Okada et al. |
| 6,538,801 B2 | 3/2003 | Jacobson et al. |
| 6,542,355 B1 | 4/2003 | Huang |
| 6,552,287 B2 | 4/2003 | Janniere |
| 6,556,112 B1 | 4/2003 | Van Zeeland et al. |
| 6,559,399 B2 | 5/2003 | Hsu et al. |
| 6,560,612 B1 | 5/2003 | Yamada et al. |
| 6,572,289 B2 | 6/2003 | Lo et al. |
| 6,573,463 B2 | 6/2003 | Ono |
| 6,585,435 B2 | 7/2003 | Fang |
| 6,624,369 B2 | 9/2003 | Ito et al. |
| 6,706,986 B2 | 3/2004 | Hsu |
| 6,738,050 B2 | 5/2004 | Comiskey |
| 6,750,414 B2 | 6/2004 | Sullivan |
| 6,759,614 B2 | 7/2004 | Yoneyama |
| 6,762,381 B2 | 7/2004 | Kunthady et al. |
| 6,765,503 B1 | 7/2004 | Chan et al. |
| 6,788,450 B2 | 9/2004 | Kawai et al. |
| 6,797,906 B2 | 9/2004 | Ohashi |
| 6,850,227 B2 | 2/2005 | Takahashi et al. |
| 6,860,660 B2 | 3/2005 | Hochgesang et al. |
| 6,911,608 B2 | 6/2005 | Levy |
| 6,926,418 B2 | 8/2005 | Osterg.ang.rd et al. |
| 6,940,030 B2 | 9/2005 | Takeda et al. |
| 6,977,352 B2 | 12/2005 | Oosawa |
| 6,979,792 B1 | 12/2005 | Lai |
| 6,987,466 B1 | 1/2006 | Welch et al. |
| 6,987,503 B2 | 1/2006 | Inoue |
| 7,012,206 B2 | 3/2006 | Oikawa |
| 7,030,330 B2 | 4/2006 | Suda |
| 7,038,832 B2 | 5/2006 | Kanbe |
| 7,126,499 B2 | 10/2006 | Lin et al. |
| 7,129,930 B1 | 10/2006 | Cathey et al. |
| 7,134,205 B2 | 11/2006 | Bruennel |
| 7,146,701 B2 | 12/2006 | Mahoney et al. |
| 7,151,236 B2 | 12/2006 | Ducruet et al. |
| 7,151,237 B2 | 12/2006 | Mahoney et al. |
| 7,154,059 B2 | 12/2006 | Chou |
| 7,166,813 B2 | 1/2007 | Soma |
| 7,172,303 B2 | 2/2007 | Shipman et al. |
| 7,189,932 B2 | 3/2007 | Kim |
| 7,256,766 B2 | 8/2007 | Albert et al. |
| 7,283,119 B2 | 10/2007 | Kishi |
| 7,301,113 B2 | 11/2007 | Nishimura et al. |
| 7,312,790 B2 | 12/2007 | Sato et al. |
| 7,378,607 B2 | 5/2008 | Koyano et al. |
| 7,385,806 B2 | 6/2008 | Liao |
| 7,391,555 B2 | 6/2008 | Albert et al. |
| 7,414,213 B2 | 8/2008 | Hwang |
| 7,429,707 B2 | 9/2008 | Yanai et al. |
| 7,432,460 B2 | 10/2008 | Clegg |
| 7,510,342 B2 | 3/2009 | Lane et al. |
| 7,531,764 B1 | 5/2009 | Lev et al. |
| 7,541,554 B2 | 6/2009 | Hou |
| 7,589,292 B2 | 9/2009 | Jung et al. |
| 7,639,187 B2 | 12/2009 | Caballero et al. |
| 7,639,571 B2 | 12/2009 | Ishii et al. |
| 7,651,231 B2 | 1/2010 | Chou et al. |
| 7,679,010 B2 | 3/2010 | Wingett |
| 7,724,415 B2 | 5/2010 | Yamaguchi |
| 7,781,690 B2 | 8/2010 | Ishii |
| 7,813,774 B2 | 10/2010 | Perez-Noguera |
| 7,842,895 B2 | 11/2010 | Lee |
| 7,847,204 B2 | 12/2010 | Tsai |
| 7,851,819 B2 | 12/2010 | Shi |
| 7,866,866 B2 | 1/2011 | Wahlstrom |
| 7,893,376 B2 | 2/2011 | Chen |
| 7,923,653 B2 | 4/2011 | Ohsumi |
| 7,947,915 B2 | 5/2011 | Lee et al. |
| 7,999,748 B2 | 8/2011 | Ligtenberg et al. |
| 8,063,325 B2 | 11/2011 | Sung et al. |
| 8,077,096 B2 | 12/2011 | Chiang et al. |
| 8,080,744 B2 | 12/2011 | Yeh et al. |
| 8,098,228 B2 | 1/2012 | Shimodaira et al. |
| 8,109,650 B2 | 2/2012 | Chang et al. |
| 8,119,945 B2 | 2/2012 | Lin |
| 8,124,903 B2 | 2/2012 | Tatehata et al. |
| 8,134,094 B2 | 3/2012 | Tsao et al. |
| 8,143,982 B1 | 3/2012 | Lauder et al. |
| 8,156,172 B2 | 4/2012 | Muehl et al. |
| 8,178,808 B2 | 5/2012 | Strittmatter et al. |
| 8,184,021 B2 | 5/2012 | Chou |
| 8,212,160 B2 | 7/2012 | Tsao |
| 8,212,162 B2 | 7/2012 | Zhou |
| 8,218,301 B2 | 7/2012 | Lee |

(56) References Cited

U.S. PATENT DOCUMENTS

| | | |
|---|---|---|
| 8,232,958 B2 | 7/2012 | Tolbert |
| 8,246,228 B2 | 8/2012 | Ko et al. |
| 8,253,048 B2 | 8/2012 | Ozias et al. |
| 8,253,052 B2 | 9/2012 | Chen |
| 8,263,887 B2 | 9/2012 | Chen et al. |
| 8,289,280 B2 | 10/2012 | Travis |
| 8,299,382 B2 | 10/2012 | Takemae et al. |
| 8,317,384 B2 | 11/2012 | Chung et al. |
| 8,319,298 B2 | 11/2012 | Hsu |
| 8,325,141 B2 | 12/2012 | Marsden |
| 8,330,725 B2 | 12/2012 | Mahowald et al. |
| 8,354,629 B2 | 1/2013 | Lin |
| 8,378,857 B2 | 2/2013 | Pance |
| 8,383,972 B2 | 2/2013 | Liu |
| 8,384,566 B2 | 2/2013 | Bocirnea |
| 8,404,990 B2 | 3/2013 | Lutgring et al. |
| 8,451,146 B2 | 3/2013 | Mahowald et al. |
| 8,431,849 B2 | 4/2013 | Chen |
| 8,436,265 B2 | 5/2013 | Koike et al. |
| 8,462,514 B2 | 6/2013 | Myers et al. |
| 8,500,348 B2 | 8/2013 | Dumont et al. |
| 8,502,094 B2 | 8/2013 | Chen |
| 8,542,194 B2 | 9/2013 | Akens et al. |
| 8,548,528 B2 | 10/2013 | Kim et al. |
| 8,564,544 B2 | 10/2013 | Jobs et al. |
| 8,569,639 B2 | 10/2013 | Strittmatter |
| 8,575,632 B2 | 11/2013 | Kuramoto et al. |
| 8,581,127 B2 | 11/2013 | Jhuang et al. |
| 8,592,699 B2 | 11/2013 | Kessler et al. |
| 8,592,702 B2 | 11/2013 | Tsai |
| 8,592,703 B2 | 11/2013 | Johnson et al. |
| 8,604,370 B2 | 12/2013 | Chao |
| 8,629,362 B1 | 1/2014 | Knighton et al. |
| 8,642,904 B2 | 2/2014 | Chiba et al. |
| 8,651,720 B2 | 2/2014 | Sherman et al. |
| 8,659,882 B2 | 2/2014 | Liang et al. |
| 8,731,618 B2 | 5/2014 | Jarvis et al. |
| 8,748,767 B2 | 6/2014 | Ozias et al. |
| 8,759,705 B2 | 6/2014 | Funakoshi et al. |
| 8,760,405 B2 | 6/2014 | Nam |
| 8,786,548 B2 | 7/2014 | Oh et al. |
| 8,791,378 B2 | 7/2014 | Lan |
| 8,835,784 B2 | 9/2014 | Hirota |
| 8,847,090 B2 | 9/2014 | Ozaki |
| 8,847,711 B2 | 9/2014 | Yang et al. |
| 8,853,580 B2 | 10/2014 | Chen |
| 8,854,312 B2 | 10/2014 | Meierling |
| 8,870,477 B2 | 10/2014 | Merminod et al. |
| 8,884,174 B2 | 11/2014 | Chou et al. |
| 8,921,473 B1 | 12/2014 | Hyman |
| 8,922,476 B2 | 12/2014 | Stewart et al. |
| 8,943,427 B2 | 1/2015 | Heo et al. |
| 8,976,117 B2 | 3/2015 | Krahenbuhl et al. |
| 8,994,641 B2 | 3/2015 | Stewart et al. |
| 9,007,297 B2 | 4/2015 | Stewart et al. |
| 9,012,795 B2 | 4/2015 | Niu et al. |
| 9,024,214 B2 | 5/2015 | Niu et al. |
| 9,029,723 B2 | 5/2015 | Pegg |
| 9,063,627 B2 | 6/2015 | Yairi et al. |
| 9,064,642 B2 | 6/2015 | Welch et al. |
| 9,086,733 B2 | 7/2015 | Pance |
| 9,087,663 B2 | 7/2015 | Los |
| 9,093,229 B2 | 7/2015 | Leong et al. |
| 9,213,416 B2 | 12/2015 | Chen |
| 9,223,352 B2 | 12/2015 | Smith et al. |
| 9,234,486 B2 | 1/2016 | Das et al. |
| 9,235,236 B2 | 1/2016 | Nam |
| 9,274,654 B2 | 3/2016 | Slobodin et al. |
| 9,275,810 B2 | 3/2016 | Pance et al. |
| 9,300,033 B2 | 3/2016 | Han et al. |
| 9,305,496 B2 | 4/2016 | Kimura |
| 9,405,369 B2 | 8/2016 | Modarres et al. |
| 9,412,533 B2 | 8/2016 | Hendren et al. |
| 9,443,672 B2 | 9/2016 | Martisauskas |
| 9,448,628 B2 | 9/2016 | Tan et al. |
| 9,448,631 B2 | 9/2016 | Winter et al. |
| 9,449,772 B2 | 9/2016 | Leong et al. |
| 9,471,185 B2 | 10/2016 | Guard |
| 9,477,382 B2 | 10/2016 | Hicks et al. |
| 9,502,193 B2 | 11/2016 | Niu et al. |
| 9,612,674 B2 | 4/2017 | Degner et al. |
| 9,640,347 B2 | 5/2017 | Kwan et al. |
| 9,704,665 B2 | 7/2017 | Brock et al. |
| 9,704,670 B2 | 7/2017 | Leong et al. |
| 9,710,069 B2 | 7/2017 | Leong et al. |
| 9,715,978 B2 | 7/2017 | Hendren |
| 9,734,965 B2 | 8/2017 | Martinez et al. |
| 9,761,389 B2 | 9/2017 | Leong et al. |
| 9,793,066 B1 | 10/2017 | Brock et al. |
| 9,916,945 B2 | 3/2018 | Niu et al. |
| 2002/0079211 A1 | 6/2002 | Katayama et al. |
| 2002/0093436 A1 | 7/2002 | Lien |
| 2002/0113770 A1 | 8/2002 | Jacobson et al. |
| 2002/0149835 A1 | 10/2002 | Kanbe |
| 2003/0169232 A1 | 9/2003 | Ito |
| 2004/0004559 A1 | 1/2004 | Rast |
| 2004/0225965 A1 | 11/2004 | Garside et al. |
| 2005/0035950 A1 | 2/2005 | Daniels |
| 2005/0253801 A1 | 11/2005 | Kobayashi |
| 2006/0011458 A1 | 1/2006 | Purcocks |
| 2006/0020469 A1 | 1/2006 | Rast |
| 2006/0120790 A1 | 6/2006 | Chang |
| 2006/0181511 A1 | 8/2006 | Woolley |
| 2006/0243987 A1 | 11/2006 | Lai |
| 2007/0200823 A1 | 8/2007 | Bytheway et al. |
| 2007/0285393 A1 | 12/2007 | Ishakov |
| 2008/0131184 A1 | 6/2008 | Brown et al. |
| 2008/0136782 A1 | 6/2008 | Mundt et al. |
| 2008/0251370 A1 | 10/2008 | Aoki |
| 2009/0046053 A1 | 2/2009 | Shigehiro et al. |
| 2009/0103964 A1 | 4/2009 | Takagi et al. |
| 2009/0128496 A1 | 5/2009 | Huang |
| 2009/0262085 A1 | 10/2009 | Wassingbo et al. |
| 2009/0267892 A1 | 10/2009 | Faubert |
| 2010/0045705 A1 | 2/2010 | Vertegaal et al. |
| 2010/0066568 A1 | 3/2010 | Lee |
| 2010/0109921 A1 | 5/2010 | Annerfors |
| 2010/0156796 A1 | 6/2010 | Kim et al. |
| 2010/0253630 A1 | 10/2010 | Homma et al. |
| 2011/0032127 A1 | 2/2011 | Roush |
| 2011/0056817 A1 | 3/2011 | Wu |
| 2011/0056836 A1 | 3/2011 | Tatebe et al. |
| 2011/0205179 A1 | 8/2011 | Braun |
| 2011/0261031 A1 | 10/2011 | Muto |
| 2011/0267272 A1 | 11/2011 | Meyer et al. |
| 2011/0284355 A1 | 11/2011 | Yang |
| 2012/0012446 A1 | 1/2012 | Hwa |
| 2012/0032972 A1 | 2/2012 | Hwang |
| 2012/0090973 A1 | 4/2012 | Liu |
| 2012/0098751 A1 | 4/2012 | Liu |
| 2012/0286701 A1 | 11/2012 | Yang et al. |
| 2012/0298496 A1 | 11/2012 | Zhang |
| 2012/0313856 A1 | 12/2012 | Hsieh |
| 2013/0043115 A1 | 2/2013 | Yang et al. |
| 2013/0093500 A1 | 4/2013 | Bruwer |
| 2013/0093733 A1 | 4/2013 | Yoshida |
| 2013/0100030 A1 | 4/2013 | Los et al. |
| 2013/0120265 A1 | 5/2013 | Horii et al. |
| 2013/0161170 A1 | 6/2013 | Fan et al. |
| 2013/0215079 A1 | 8/2013 | Johnson et al. |
| 2013/0242601 A1 | 9/2013 | Kloeppel et al. |
| 2013/0270090 A1 | 10/2013 | Lee |
| 2014/0015777 A1 | 1/2014 | Park et al. |
| 2014/0027259 A1 | 1/2014 | Kawana et al. |
| 2014/0071654 A1 | 3/2014 | Chien |
| 2014/0082490 A1 | 3/2014 | Jung et al. |
| 2014/0090967 A1 | 4/2014 | Inagaki |
| 2014/0098042 A1 | 4/2014 | Kuo et al. |
| 2014/0151211 A1 | 6/2014 | Zhang |
| 2014/0184496 A1 | 7/2014 | Gribetz et al. |
| 2014/0191973 A1 | 7/2014 | Zellers et al. |
| 2014/0218851 A1 | 8/2014 | Klein et al. |
| 2014/0252881 A1 | 9/2014 | Dinh et al. |
| 2014/0291133 A1 | 10/2014 | Fu et al. |

(56) References Cited

U.S. PATENT DOCUMENTS

| | | | |
|---|---|---|---|
| 2014/0375141 | A1 | 12/2014 | Nakajima |
| 2015/0016038 | A1 | 1/2015 | Niu et al. |
| 2015/0083561 | A1 | 3/2015 | Han et al. |
| 2015/0270073 | A1 | 9/2015 | Yarak, III et al. |
| 2015/0277559 | A1 | 10/2015 | Vescovi et al. |
| 2015/0287553 | A1 | 10/2015 | Welch et al. |
| 2015/0309538 | A1 | 10/2015 | Zhang |
| 2015/0370339 | A1 | 12/2015 | Ligtenberg et al. |
| 2015/0378391 | A1 | 12/2015 | Huitema et al. |
| 2016/0049266 | A1 | 2/2016 | Stringer et al. |
| 2016/0093452 | A1 | 3/2016 | Zercoe et al. |
| 2016/0172129 | A1 | 6/2016 | Zercoe et al. |
| 2016/0189890 | A1 | 6/2016 | Leong et al. |
| 2016/0189891 | A1 | 6/2016 | Zercoe et al. |
| 2016/0259375 | A1 | 9/2016 | Andre et al. |
| 2016/0329166 | A1 | 11/2016 | Hou et al. |
| 2016/0336124 | A1 | 11/2016 | Leong et al. |
| 2016/0336127 | A1 | 11/2016 | Leong et al. |
| 2016/0336128 | A1 | 11/2016 | Leong et al. |
| 2016/0343523 | A1 | 11/2016 | Hendren et al. |
| 2016/0351360 | A1 | 12/2016 | Knopf et al. |
| 2016/0365204 | A1 | 12/2016 | Cao et al. |
| 2016/0378234 | A1 | 12/2016 | Ligtenberg et al. |
| 2016/0379775 | A1 | 12/2016 | Leong et al. |
| 2017/0004939 | A1 | 1/2017 | Kwan et al. |
| 2017/0011869 | A1 | 1/2017 | Knopf et al. |
| 2017/0090104 | A1 | 3/2017 | Cao et al. |
| 2017/0090106 | A1 | 3/2017 | Cao et al. |
| 2017/0301487 | A1 | 10/2017 | Leong et al. |
| 2017/0315624 | A1 | 11/2017 | Leong et al. |
| 2018/0029339 | A1 | 2/2018 | Liu et al. |
| 2018/0040441 | A1 | 2/2018 | Wu et al. |
| 2018/0074694 | A1 | 3/2018 | Lehmann et al. |

FOREIGN PATENT DOCUMENTS

| | | |
|---|---|---|
| CN | 1533128 | 9/2004 |
| CN | 1542497 | 11/2004 |
| CN | 2672832 | 1/2005 |
| CN | 1624842 | 6/2005 |
| CN | 1812030 | 8/2006 |
| CN | 1838036 | 9/2006 |
| CN | 1855332 | 11/2006 |
| CN | 101051569 | 10/2007 |
| CN | 200961844 | 10/2007 |
| CN | 200986871 | 12/2007 |
| CN | 101146137 | 3/2008 |
| CN | 201054315 | 4/2008 |
| CN | 201084602 | 7/2008 |
| CN | 201123174 | 9/2008 |
| CN | 201149829 | 11/2008 |
| CN | 101315841 | 12/2008 |
| CN | 201210457 | 3/2009 |
| CN | 101438228 | 5/2009 |
| CN | 101465226 | 6/2009 |
| CN | 101494130 | 7/2009 |
| CN | 101502082 | 8/2009 |
| CN | 201298481 | 8/2009 |
| CN | 101546667 | 9/2009 |
| CN | 101572195 | 11/2009 |
| CN | 101800281 | 8/2010 |
| CN | 101807482 | 8/2010 |
| CN | 101868773 | 10/2010 |
| CN | 201655616 | 11/2010 |
| CN | 102110542 | 6/2011 |
| CN | 102119430 | 7/2011 |
| CN | 201904256 | 7/2011 |
| CN | 102163084 | 8/2011 |
| CN | 201927524 | 8/2011 |
| CN | 201945951 | 8/2011 |
| CN | 201945952 | 8/2011 |
| CN | 201956238 | 8/2011 |
| CN | 102197452 | 9/2011 |
| CN | 202008941 | 10/2011 |
| CN | 202040690 | 11/2011 |
| CN | 102280292 | 12/2011 |
| CN | 102338348 | 2/2012 |
| CN | 102375550 | 3/2012 |
| CN | 202205161 | 4/2012 |
| CN | 102496509 | 6/2012 |
| CN | 10269527 | 8/2012 |
| CN | 102622089 | 8/2012 |
| CN | 102629526 | 8/2012 |
| CN | 202372927 | 8/2012 |
| CN | 102679239 | 9/2012 |
| CN | 102683072 | 9/2012 |
| CN | 202434387 | 9/2012 |
| CN | 202523007 | 11/2012 |
| CN | 102832068 | 12/2012 |
| CN | 102955573 | 3/2013 |
| CN | 102956386 | 3/2013 |
| CN | 102969183 | 3/2013 |
| CN | 103000417 | 3/2013 |
| CN | 103165327 | 6/2013 |
| CN | 103180979 | 6/2013 |
| CN | 203012648 | 6/2013 |
| CN | 203135988 | 8/2013 |
| CN | 103377841 | 10/2013 |
| CN | 103489986 | 1/2014 |
| CN | 203414880 | 1/2014 |
| CN | 103681056 | 3/2014 |
| CN | 103699181 | 4/2014 |
| CN | 203520312 | 4/2014 |
| CN | 203588895 | 5/2014 |
| CN | 103839715 | 6/2014 |
| CN | 103839720 | 6/2014 |
| CN | 103839722 | 6/2014 |
| CN | 103903891 | 7/2014 |
| CN | 103956290 | 7/2014 |
| CN | 203733685 | 7/2014 |
| CN | 104021968 | 9/2014 |
| CN | 204102769 | 1/2015 |
| CN | 204117915 | 1/2015 |
| CN | 104517769 | 4/2015 |
| CN | 204632641 | 9/2015 |
| CN | 105097341 | 11/2015 |
| DE | 2530176 | 1/1977 |
| DE | 3002772 | 7/1981 |
| DE | 29704100 | 4/1997 |
| DE | 202008001970 | 8/2008 |
| EP | 0441993 | 8/1991 |
| EP | 1835272 | 9/2007 |
| EP | 1928008 | 6/2008 |
| EP | 2202606 | 6/2010 |
| EP | 2426688 | 3/2012 |
| EP | 2439760 | 4/2012 |
| EP | 2463798 | 6/2012 |
| EP | 2664979 | 11/2013 |
| FR | 2147420 | 3/1973 |
| FR | 2911000 | 7/2008 |
| FR | 2950193 | 3/2011 |
| GB | 1361459 | 7/1974 |
| JP | S50115562 | 9/1975 |
| JP | S60055477 | 3/1985 |
| JP | S61172422 | 10/1986 |
| JP | S62072429 | 4/1987 |
| JP | S63182024 | 11/1988 |
| JP | H0422024 | 4/1992 |
| JP | H0520963 | 1/1993 |
| JP | H0524512 | 8/1993 |
| JP | H05342944 | 12/1993 |
| JP | H09204148 | 8/1997 |
| JP | H10312726 | 11/1998 |
| JP | H11194882 | 7/1999 |
| JP | 2000010709 | 1/2000 |
| JP | 2000057871 | 2/2000 |
| JP | 2000339097 | 12/2000 |
| JP | 2001100889 | 4/2001 |
| JP | 2003114751 | 9/2001 |
| JP | 2002260478 | 9/2002 |
| JP | 2002298689 | 10/2002 |
| JP | 2003522998 | 7/2003 |
| JP | 2005108041 | 4/2005 |
| JP | 2006164929 | 6/2006 |

(56) References Cited

FOREIGN PATENT DOCUMENTS

| | | |
|---|---|---|
| JP | 2006185906 | 7/2006 |
| JP | 2006521664 | 9/2006 |
| JP | 2006269439 | 10/2006 |
| JP | 2006277013 | 10/2006 |
| JP | 2006344609 | 12/2006 |
| JP | 2007115633 | 5/2007 |
| JP | 2007514247 | 5/2007 |
| JP | 2007156983 | 6/2007 |
| JP | 2008021428 | 1/2008 |
| JP | 2008041431 | 2/2008 |
| JP | 2008100129 | 5/2008 |
| JP | 2008191850 | 8/2008 |
| JP | 2008533559 | 8/2008 |
| JP | 2008293922 | 12/2008 |
| JP | 2009099503 | 5/2009 |
| JP | 2009181894 | 8/2009 |
| JP | 2010061956 | 3/2010 |
| JP | 2010244088 | 10/2010 |
| JP | 2010244302 | 10/2010 |
| JP | 2011018484 | 1/2011 |
| JP | 2011065126 | 3/2011 |
| JP | 2011150804 | 8/2011 |
| JP | 2011165630 | 8/2011 |
| JP | 2011524066 | 8/2011 |
| JP | 2011187297 | 9/2011 |
| JP | 2012022473 | 2/2012 |
| JP | 2012043705 | 3/2012 |
| JP | 2012063630 | 3/2012 |
| JP | 2012098873 | 5/2012 |
| JP | 2012134064 | 7/2012 |
| JP | 2012186067 | 9/2012 |
| JP | 2012230256 | 11/2012 |
| JP | 2014017179 | 1/2014 |
| JP | 2014026807 | 2/2014 |
| JP | 2014216190 | 11/2014 |
| JP | 2014220039 | 11/2014 |
| JP | 2016053778 | 4/2016 |
| KR | 1019990007394 | 1/1999 |
| KR | 1020020001668 | 1/2002 |
| KR | 100454203 | 10/2004 |
| KR | 1020060083032 | 7/2006 |
| KR | 1020080064116 | 7/2008 |
| KR | 1020080066164 | 7/2008 |
| KR | 2020110006385 | 6/2011 |
| KR | 1020120062797 | 6/2012 |
| KR | 1020130040131 | 4/2013 |
| KR | 20150024201 | 3/2015 |
| TW | 200703396 | 1/2007 |
| TW | M334397 | 6/2008 |
| TW | 201108284 | 3/2011 |
| TW | 201108286 | 3/2011 |
| TW | M407429 | 7/2011 |
| TW | 201246251 | 11/2012 |
| TW | 201403646 | 1/2014 |
| WO | WO9744946 | 11/1997 |
| WO | WO2005/057320 | 6/2005 |
| WO | WO2006/022313 | 3/2006 |
| WO | WO2007/049253 | 5/2007 |
| WO | WO2008/045833 | 4/2008 |
| WO | WO2009/005026 | 1/2009 |
| WO | WO2012/011282 | 1/2012 |
| WO | WO2012/027978 | 3/2012 |
| WO | WO2013/096478 | 6/2013 |
| WO | WO2014175446 | 10/2014 |

OTHER PUBLICATIONS

International Search Report and Written Opinion, PCT/US2016/032492, 29 pages, dated Jul. 25, 2016.

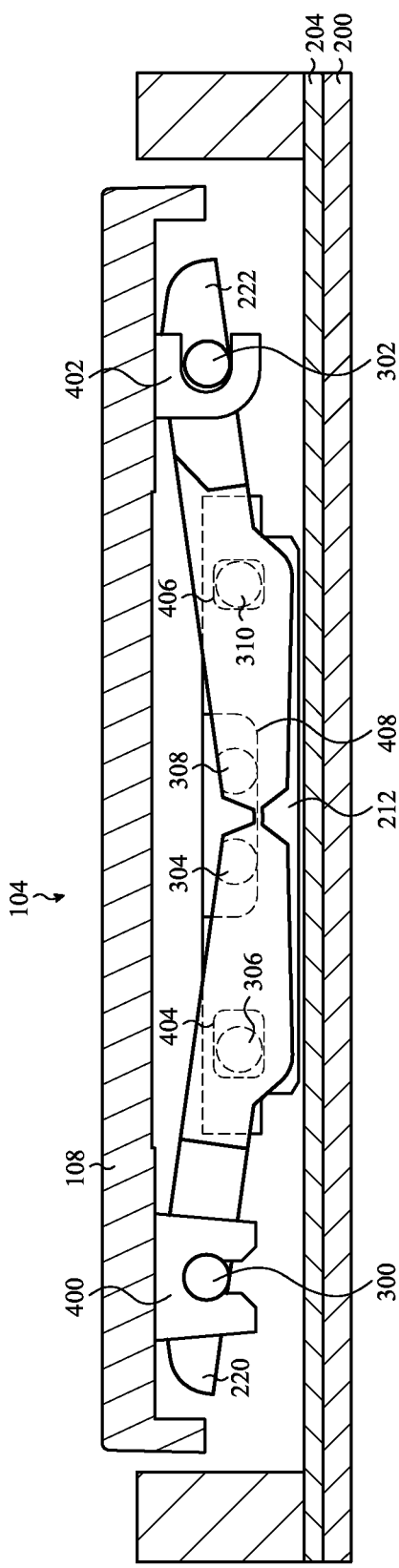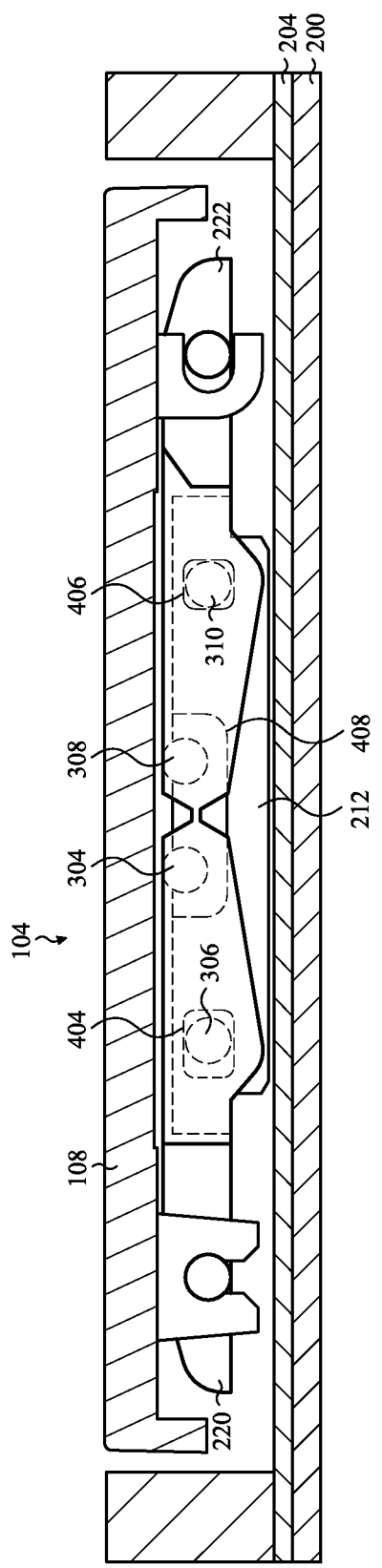

ILLUMINATED LOW-TRAVEL KEY MECHANISM FOR A KEYBOARD

CROSS-REFERENCE TO RELATED APPLICATION(S)

This application is a continuation patent application of U.S. patent application Ser. No. 15/154,706, filed May 13, 2016 and titled "Low-Travel Key Mechanism for an Input Device," which is a nonprovisional patent application of and claims the benefit of U.S. Provisional Patent Application No. 62/161,103, filed on May 13, 2015, and entitled "Low-Travel Key Mechanism For An Input Device," the disclosures of which are hereby incorporated herein by reference in their entireties.

FIELD

The present invention relates generally to electronic devices, and more particularly to input devices for electronic devices.

BACKGROUND

Many electronic devices typically include one or more input devices such as keyboards, touchpads, mice, or touchscreens that enable a user to interact with the device. These devices can be integrated into an electronic device or can stand alone as discrete devices that transmit signals to another device either via a wired or wireless connection. For example, a keyboard can be integrated into the housing of a laptop computer or it can exist as a separate device that is operably connected to a computer.

It is often desirable to reduce the size of an electronic device and to minimize the machining costs and manufacturing time of the device. However, as the overall size of an electronic device is reduced, the available space for the keyboard and its various components is also reduced. Consequently, the internal components of the keyboard may be reduced in size or eliminated to decrease the overall size, dimension, and/or thickness of the keyboard assembly. But the reduction or elimination of components or layer(s) in the stack-up of the keyboard may negatively affect the functionality of the keyboard or may require significant reworking of the stack-up, which can increase the time, complexity, and/or cost to manufacture the keyboard assembly.

Additionally or alternatively, the reduction or elimination of components or layer(s) in the stack-up may negatively affect the tactile response or "feel" of the key mechanisms in the keyboard. For example, a key mechanism may not provide a user with a desirable amount of tactile response (a "click") when the user depresses a key mechanism. Alternatively, the downward movement of the key mechanism can be non-uniform depending on where the user presses down on the key mechanism. For example, the downward movement of the key mechanism can differ depending on whether the user presses down at the center of a key mechanism, at a corner of the key mechanism, or at the edge of the key mechanism.

SUMMARY

A keycap mechanism for an electronic device can include a switch housing and a hinged structure. The switch housing may include switch pin retaining mechanisms that may be positioned on at least two sides of the switch housing (e.g., on opposing sides of the switch housing). The hinged structure includes two separate wings that are positioned adjacent to each other such that a cavity is formed between the two wings. The two wings are coupled together by coupling elements. Each wing of the hinged structure can include switch housing pins that extend into the cavity and are configured to couple with the switch pin retaining mechanisms in the switch housing. Various configurations of switch pin retaining mechanisms and switch housing pins can be used to attach the hinged structure to the switch housing.

For example, in one embodiment the switch pin retaining mechanisms include a pair of U-shaped switch pin retaining mechanisms on two opposing sides of the switch housing. The U-shaped switch pin retaining mechanisms in each pair may include openings that face the keycap and are configured to receive switch housing pins. Alternatively, at least one U-shaped switch pin retaining mechanism in a pair has an opening that faces the keycap and is configured to receive a switch housing pin.

In another embodiment, the switch pin retaining mechanisms include a pair of L-shaped or U-shaped switch pin retaining mechanisms on two opposing sides of the switch housing. The L-shaped or U-shaped switch pin retaining mechanisms in each pair may include openings that face each other and are configured to receive switch housing pins. Alternatively, at least one L-shaped or U-shaped switch pin retaining mechanism in a pair has an opening that faces towards or away from the other switch pin retaining mechanism in the pair.

In another embodiment, the switch pin retaining mechanisms include a pair of U-shaped switch pin retaining mechanisms on two opposing sides of the switch housing. The U-shaped switch pin retaining mechanisms in each pair may include openings that face downward (e.g., toward a substrate). The U-shaped switch pin retaining mechanisms are configured to receive switch housing pins. Alternatively, at least one U-shaped switch pin retaining mechanism in a pair has an opening that faces the substrate and is configured to receive a switch housing pin.

In yet another embodiment, the switch pin retaining mechanisms include a pair of switch pin retaining mechanisms on two opposing sides of the switch housing. One switch pin retaining mechanism in the pair can be a U-shaped switch pin retaining mechanism and the other switch pin retaining mechanism in the pair can be a U-shaped or L-shaped switch pin retaining mechanism. The openings in the U-shaped and L-shaped retaining mechanism can face any direction.

The keycap mechanism can be included in an electronic device. For example, the keycap mechanism can be part of a keyboard assembly. The electronic device can include an enclosure with the keyboard assembly positioned at least partially within the enclosure. The keyboard assembly may include a substrate positioned within the enclosure, with the switch housing and the hinged structure positioned over the substrate. Each wing in the hinged structure can include keycap pins on each arm that extend out from an exterior surface of the wing. The electronic device may also include a keycap that includes keycap pin retaining mechanisms that are configured to couple to the keycap pins on the hinged structure, a membrane layer attached to the substrate, and a dome switch coupled to the membrane layer and positioned in the cavity of the hinged structure.

In some embodiments, a hinged structure can include two separate wings positioned adjacent to each other such that a cavity is formed between the two wings. The two wings are coupled together by coupling elements. Each wing includes a pair of switch housing pins on each arm of the wing that extend into the cavity and keycap pins that extend out from an exterior surface of the wing. At least a portion of each coupling element may be formed with a fabric.

In another aspect, a method of assembling a key mechanism can include bending a flexible switch housing and positioning the bended switch housing within a cavity of a hinged structure. The switch housing includes switch pin retaining mechanisms and the hinged structure includes corresponding switch housing pins. The switch housing pins are then placed into respective switch pin retaining mechanisms and the flexible switch housing is unbended such that the switch housing pins are retained within the switch pin retaining mechanisms.

BRIEF DESCRIPTION OF THE DRAWINGS

The disclosure will be readily understood by the following detailed description in conjunction with the accompanying drawings, wherein like reference numerals designate like structural elements, and in which:

FIG. 4 illustrates a side view of the key mechanism shown in FIG. 2 depicting the attachment of the hinged structure to the switch housing when the key mechanism in a rest position;

FIG. 5 depicts a side view of the key mechanism shown in FIG. 2 illustrating the attachment of the hinged structure to the switch housing when the key mechanism is in a depressed position;

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Embodiments described herein provide a key mechanism for an input device (e.g., a keyboard) that includes a hinged structure, such as a butterfly hinge. The hinged key mechanism can enable substantially low travel distances with good tactile response. The hinged structure includes a double wing design operative to move between a depressed position and non-depressed or rest position. Corresponding arms of the hinged structure are coupled together with coupling elements. The coupling elements can be, for example, a flexible hinge, a gear hinge, an over-molded hinge, and/or a fabric hinge. Various techniques are disclosed for coupling the hinged structure to a switch housing.

The techniques disclosed herein for attaching the hinged structure to the switch housing can produce a key mechanism that is easier to assemble and manufacture compared to conventional key mechanisms. Additionally or alternatively, one or more of the techniques can increase the retention force of the attachment between the hinged structure and the switch housing so that it is more difficult to accidentally separate the hinged structure from the switch housing. In some embodiments, one or more of the techniques can simplify the structure of the key mechanism, the switch housing, and/or the hinged structure.

These and other embodiments are discussed below with reference to FIGS. 1-20. However, those skilled in the art will readily appreciate that the detailed description given herein with respect to these Figures is for explanatory purposes only and should not be construed as limiting.

Figure 1:
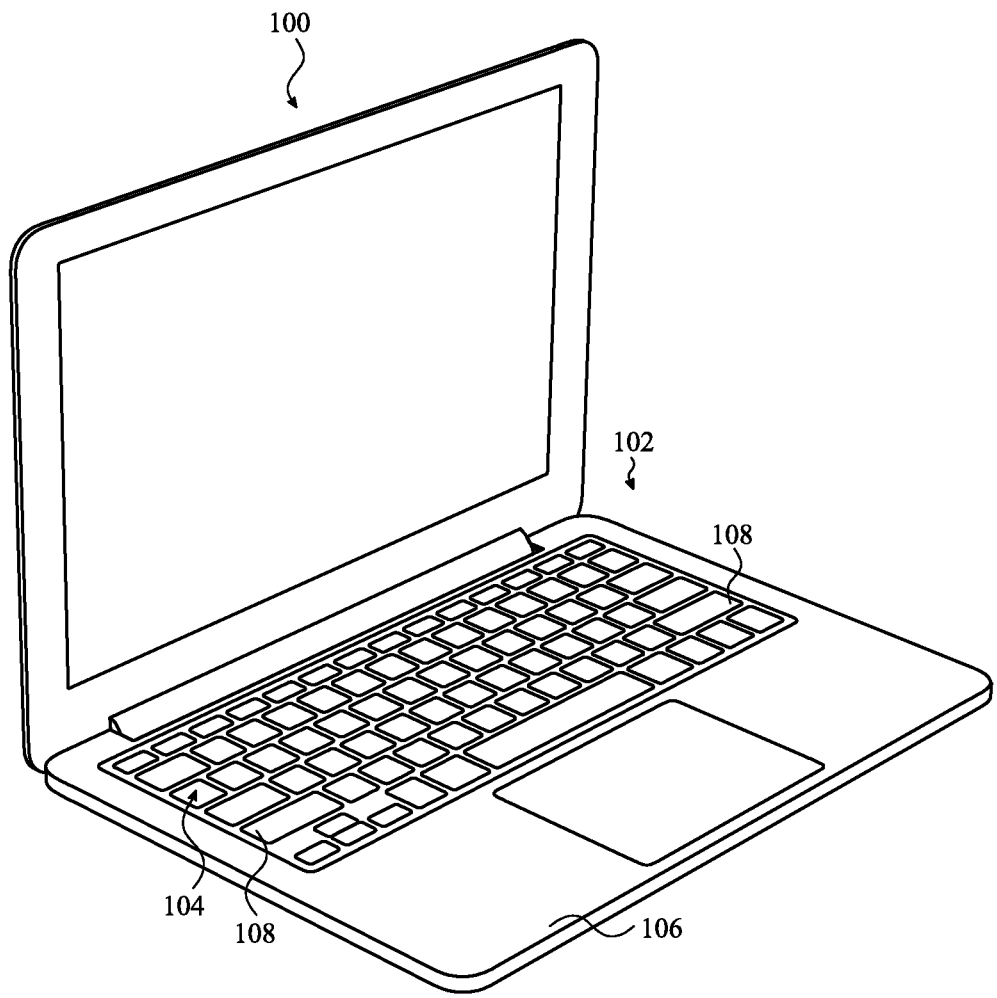
FIG. 1 depicts an example electronic device that includes a keyboard assembly.

FIG. 1 shows an illustrative electronic device that includes a keyboard assembly. The key mechanisms in the keyboard assembly include a switch housing that is attached to a support element or hinged structure by coupling multiple switch housing pins on the hinged structure to corresponding switch pin retaining mechanisms formed in the sides of the switch housing (e.g., on two opposing sides of the switch housing). The hinged structure includes two separate wings that are positioned adjacent to each other and coupled together with coupling elements. Each coupling element (or a portion of a coupling element) can be formed with a fabric, which may increase the strength of the coupling elements. For example, the weave in the fabric can allow a coupling element to bend or flex in one direction but not in another. Additionally, in some embodiments at least a portion of the switch housing is flexible to simplify the attachment process and to reduce the amount of time needed to attach the hinged structure to the switch housing.

In the illustrated embodiment, the electronic device 100 is shown as a laptop computer. However, the electronic device 100 may be any suitable electronic device that may utilize a keyboard assembly, a key mechanism, or a similar input device or structure. For example, the electronic device 100 may be a desktop computer, a tablet computing device, a smartphone, a gaming device, a display, a digital music player, a wearable computing device or display, a health monitoring device, and so on. Likewise, the key mechanism 104, and the components of the key mechanism 104 discussed herein, may be utilized or implemented in a variety of input mechanisms including, but not limited to, buttons, switches, toggles, and wheels.

The electronic device 100 may include an enclosure 106. The enclosure 106 may take the form of an exterior housing or shell for the electronic device 100 and the various internal components in the electronic device 100. The enclosure 106 may be formed as a single, integral component or as two or more components that operably connect together, such as a front piece and a back piece. Additionally, the enclosure 106 may be formed from any suitable material. In non-limiting examples, the enclosure 106 may be made from a metal, a ceramic, a rigid plastic or another polymer, a fiber-matrix composite, and so on.

The keyboard assembly 102 allows a user to interact with the electronic device 100. Each key mechanism 104 may include a keycap 108 that is positioned within the enclosure 106 of the electronic device 100. The keycaps 108 may partially protrude from the enclosure 106 and each may be substantially surrounded by the enclosure 106. That is, the keycaps 108 may extend beyond a surface of the enclosure 106 and may be divided or separated by a portion of the enclosure 106. In the non-limiting example shown in FIG. 1, the keyboard assembly 102 may be positioned within and/or may be received by the electronic device 100. In another embodiment, the keyboard assembly 102 may be a distinct, standalone component that is operably connected to the electronic device 100 via a wired or wireless connection.

Figure 2:
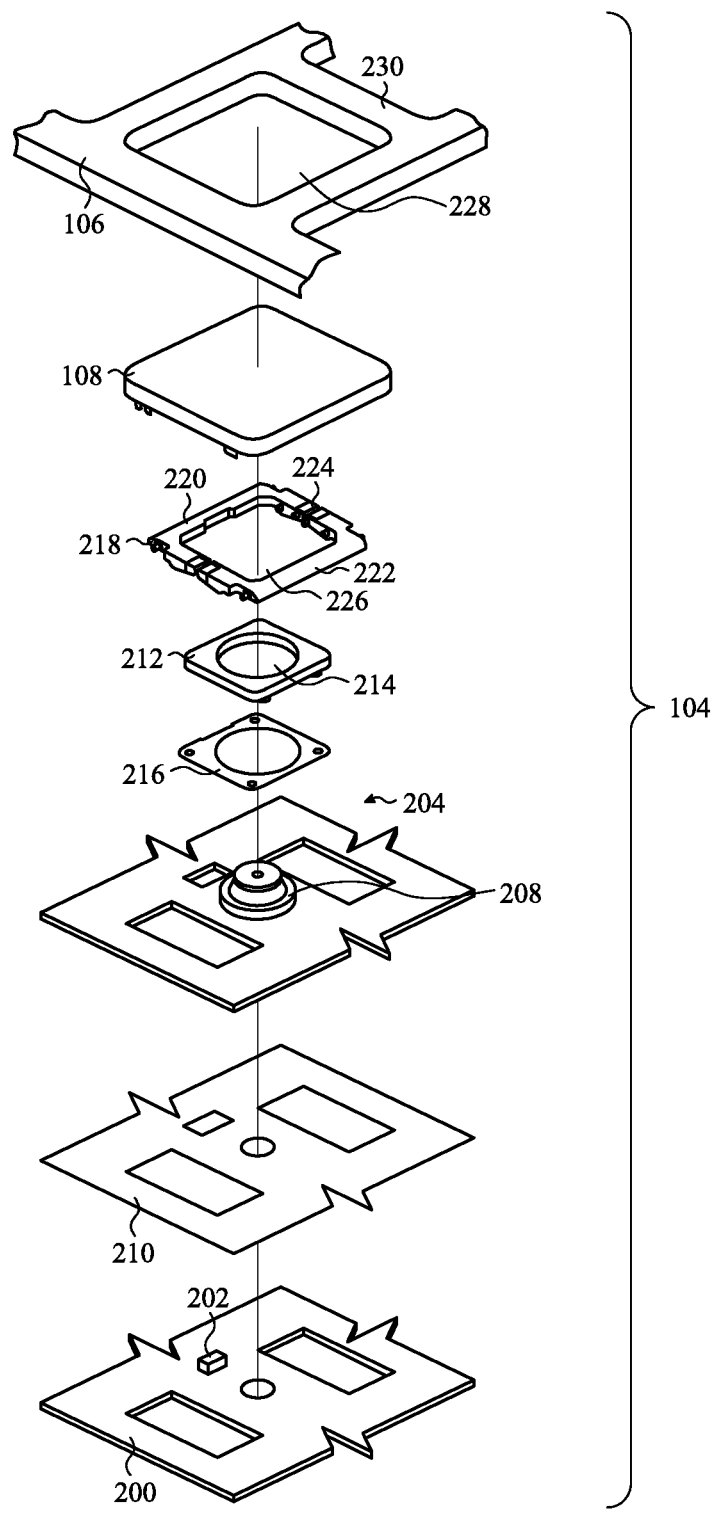
FIG. 2 illustrates an exploded view of one example of a key mechanism shown in FIG. 1.

FIG. 2 illustrates an exploded view of one example of a key mechanism shown in FIG. 1. The key mechanism 104 may be formed from various layers of components, or a stack-up of layered components. Each layer and/or component of the stack-up may provide different functionality and/or operations for the electronic device 100. Although a single key mechanism 104 is shown in FIG. 2, in some embodiments multiple key mechanisms in the keyboard assembly 102 may be formed from similar components and/or layers in a similar configuration and/or may function in a substantially similar manner. Other embodiments can include different or additional layers in a key mechanism than the layers shown in FIG. 2.

The keyboard assembly 102 may include a substrate 200 positioned within the enclosure 106. In one embodiment, the substrate 200 can be a printed circuit board (PCB). The substrate 200 may provide a rigid support structure for the various components forming the keyboard assembly 102. The substrate 200 may include a plurality of electrical traces (not shown) formed therein that may be in electrical communication with distinct components or layers of the keyboard assembly 102. The traces may subsequently provide an electrical signal (e.g., input) to the electronic device 100 when a keycap and/or dome switch is compressed, as discussed herein. The substrate 200 may cover and/or may include a geometry that is substantially equal to the area of keyboard assembly 102.

As shown in FIG. 2, a light source 202 may be positioned on the substrate 200. The light source 202 may be formed from any suitable light source configured to illuminate the key mechanism 104 and/or the keycap 108. In a non-limiting example, the light source 202 may be a light emitting diode (LED) coupled and/or affixed to the substrate 200.

The key mechanism 104 may also include a membrane layer 204. In some embodiments, the membrane layer 204 may be a sensing membrane that includes at least one trace or sensor positioned in or on the membrane layer 204. As discussed herein, traces or sensors positioned in or on the membrane layer 204 may be configured to detect or determine when the keycap 108 is actuated or depressed by a user, and subsequently provide an electrical signal (e.g., input) to the electronic device 100.

As shown in FIG. 2, a dome switch 208 may be coupled directly to the membrane layer 204. The dome switch 208 may be formed from any suitable material that is substantially flexible, durable, and/or elastic. In a non-limiting example, the dome switch 208 may be formed from an elastomeric material such as rubber. As discussed herein, when the keycap 108 is depressed by a user, the dome switch 208 collapses such that a portion of the dome switch 208 contacts the membrane layer 204 to form an electrical connection and/or input within the electronic device 100.

An adhesive layer 210 may be positioned between the membrane layer 204 and the substrate 200 to attach or directly couple the membrane layer 204 to the substrate 200. For example, an anisotropic conductive film can be used to adhere and/or bond the membrane layer 204 to the substrate 200. In another non-limiting example, a pressure sensitive adhesive may be used to attach the membrane layer 204 to the substrate 200.

The key mechanism 104 may also include a switch housing 212. The switch housing 212 may be formed with any suitable material, including, but not limited to, metal, plastic, and ceramic. As shown in FIG. 2, the switch housing 212 may be positioned above the substrate 200 and may substantially surround the dome switch 208. In a non-limiting example, the dome switch 208, coupled directly to the membrane layer 204, may be positioned within an opening 214 of the switch housing 212. In one embodiment, the switch housing 212 may be attached to the membrane layer 204 using an adhesive layer 216. The switch housing 212 may be formed from a substantially rigid material for providing support to the various components of the key mechanism 104 and/or for protecting and/or sealing the dome switch 208 within the key mechanism 104. Additionally, the material forming the switch housing 212 may include optically transparent properties for distributing and/or dispersing the light emitted by the light source 202.

Figure 3:
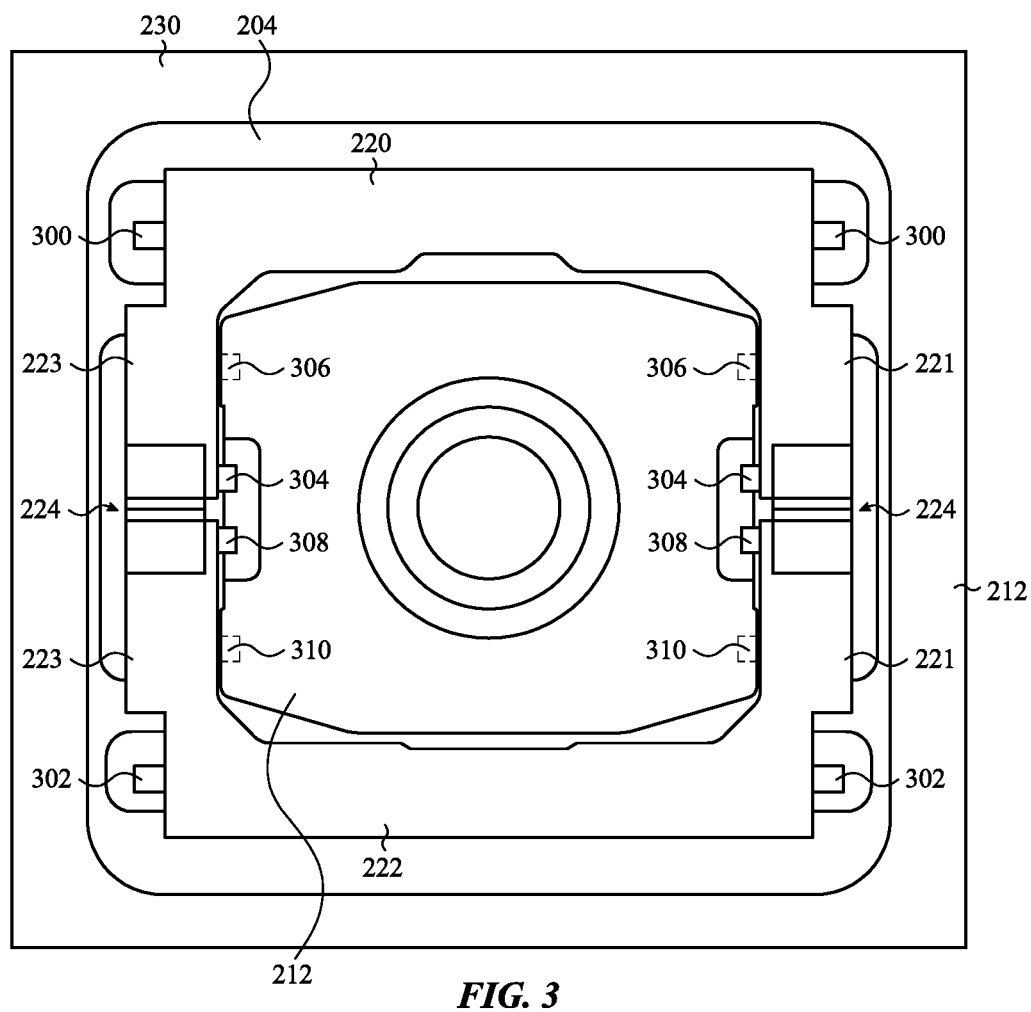
FIG. 3 depicts a top view of the key mechanism shown in FIG. 2 with the keycap removed.

A hinged structure 218 may be positioned outside of and adjacent to the sides of the switch housing 212. In one embodiment, the hinged structure 218 is a butterfly hinge. The hinged structure 218 may be formed with any suitable material, such as a plastic. As shown in FIGS. 2 and 3, the switch housing 212 may be positioned between (e.g., around) and/or may separate the dome switch 208 and the hinged structure 218. The hinged structure 218 may be affixed within the key mechanism 104 by being coupled to the switch housing 212 and to the keycap 108.

The support element or hinged structure 218 supports the keycap 108 and functions as a movable hinge that enables the keycap 108 to move relative to the substrate 200. The hinged structure 218 includes wings 220 and 222, which are separate components coupled together by coupling elements 224. The wings 220, 222 may each include a cutout that defines a cavity 226 when the wings 220, 222 are coupled together. The cavity 226 can have any suitable shape such as, for example, a square, a rectangle, circle, or ellipse. The switch housing 212 resides within the cavity 226 and the dome switch 208 extends into the cavity 226 when the key mechanism 104 is assembled.

As will be described in more detail later, each wing 220, 222 of the hinged structure 218 may include switch housing pins 304, 306, 308, 310 on each arm 221, 223 (see FIG. 3) of the wings 220, 222 that extend into the cavity 226 and are configured to couple with the switch pin retaining mechanisms 404, 406, 408 in the switch housing 212 (see FIG. 4). Each wing 220, 222 can also include keycap pins 300, 302 on each arm 221, 223 that extend out from an exterior surfaces of the wings 220, 222 (see FIG. 3).

The coupling elements 224 can be formed with any suitable material. In some embodiments, the coupling elements 224 are formed with a flexible elastic material, such as rubber. In other embodiments, at least a portion of each coupling element 224 can be formed with a fabric. The fabric can increase the strength of the coupling element 224. For example, the weave in the fabric can allow the coupling element 224 to bend or flex in one direction but not in another. Additionally or alternatively, in some embodiments the fabric can be formed to be thinner than other materials, which may reduce the size (e.g., length and/or height) of the hinged structure 218.

As shown in FIGS. 1 and 2, the keycap 108 may protrude or extend, at least partially, through opening 228 formed in the enclosure 106. Additionally, the various keycaps 108 of the keyboard assembly 102 may be substantially surrounded and/or separated by web 230 of the enclosure 106.

FIG. 3 is a top view of the key mechanism shown in FIG. 2 with the keycap removed. FIG. 4 illustrates a side view of the key mechanism shown in FIG. 2 depicting the attachment of the hinged structure to the switch housing when the key mechanism is in a rest position. FIG. 5 illustrates a side view of the key mechanism shown in FIG. 2 depicting the attachment of the hinged structure to the switch housing when the key mechanism is in a depressed position. In FIGS. 4 and 5, other components and layers that may be included in the key mechanism, such as, for example, the adhesive layer 210, the dome switch 208, and the adhesive layer 216, are not shown for clarity.

With respect to FIGS. 3-5, the wings 220, 222 each include keycap pins 300, 302 and switch housing pins 304, 306, 308, 310. The keycap pins 300 each attach to respective keycap pin retaining mechanisms 400 disposed on the bottom surface of the keycap 108. The keycap pin retaining mechanisms 400 can be integrally formed with the keycap 108 or attached to the keycap 108. The keycap pin retaining mechanisms 400 secure the keycap pins 300 in place and enable the keycap pins 300 to rotate freely when the key mechanism 104 moves between the rest and depressed positions.

Similarly, the keycap pins 302 are held in place by respective keycap pin retaining mechanisms 402 disposed on the bottom surface of the keycap 108. The keycap pin retaining mechanisms 402 can be integrally formed with the keycap 108 or attached to the keycap 108. The keycap pin retaining mechanisms 402 secure the keycap pins 302 in place and enable the keycap pins 302 to slide freely when the key mechanism 104 moves between the rest and depressed positions. As shown in FIGS. 4 and 5, the keycap pin retaining mechanisms 400 are configured as u-clip or c-clip retaining members while the keycap pin retaining mechanisms 402 have an L or C shape. Other embodiments can use a different structure for a keycap pin retaining mechanism 400, 402 and/or may orient a keycap pin retaining mechanism differently.

The coupling elements 224 enable the wings 220, 222 to move independent of each other. Thus, if one wing is locked in a position, the other wing is free to move, and vice versa. Both wings 220, 222 are secured to the switch housing 212 (via switch housing pins 304, 306, 308, 310) and the keycap 108 (via keycap pins 300, 302) and are operative to move (or flap) in concert with each other, with the coupling elements 224 changing the positions of the wings 220, 222 between a v-shaped position (the rest position) and a substantially flat-shaped position (the depressed position). In other embodiments, the coupling elements 224 can be omitted from the hinged structure 218.

The manner in which the switch housing pins 304, 306, 308, 310 couple to the switch housing 212 varies depending on specific embodiments, which are discussed below. In the embodiment of FIGS. 4 and 5, the switch housing pins 304, 306, 308, 310 couple to respective switch pin retaining mechanisms 404, 406, 408 of the switch housing 212. The switch pin retaining mechanisms 404 and 406 secure the switch housing pins 306 and 310, respectively, in place and enable the switch housing pins 306, 310 to rotate freely within a respective switch pin retaining mechanism 404, 406 when the hinged structure 218 is attached to the switch housing 212. The switch pin retaining mechanisms 404 and 406 permit the switch housing pins 306 and 310 to rotate when the keycap 108 is depressed. In a non-limiting example, the switch pin retaining mechanisms 404, 406 are each formed as a cutout or a cavity in a side of the switch housing 212 at a location that corresponds to a respective switch housing pin 306, 310.

The switch pin retaining mechanism 408 is configured to permit the switch housing pins 304 and 308 to move (e.g., slide and/or raise and lower) when the key mechanism 104 transitions between the rest and the depressed positions. The switch pin retaining mechanism 408 secures the switch housing pins 304 and 308 in place and enables the switch housing pins 304, 308 to move freely within the switch pin retaining mechanism 408 when the hinged structure 218 is attached to the switch housing 212. In a non-limiting example, each switch pin retaining mechanism 408 is formed as a cutout in a side of the switch housing 212 at a location that corresponds to the switch housing pins 304, 308. In one embodiment, the switch pin retaining mechanisms 404, 406, 408 are formed in opposing sides of the switch housing 212.

In the embodiments shown in FIGS. 2-5, the hinged structure 218 can be pre-installed in the switch housing 212 (from the top side of the switch housing) prior to fabrication of the keyboard assembly 102. This is described in more detail in conjunction with FIG. 10. The combined hinged structure 218 and switch housing 212 can then be attached to the membrane layer 204 or to the substrate 200.

Figure 6:
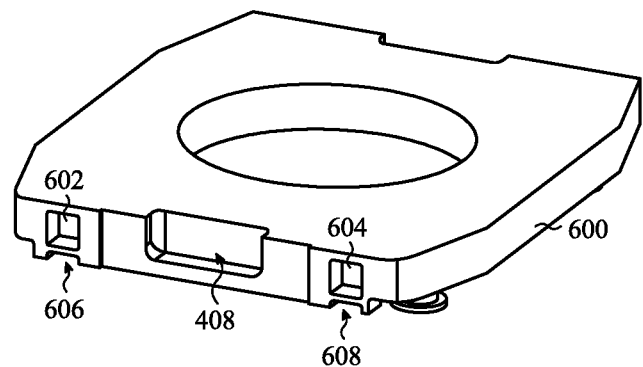
FIG. 6 illustrates a top view of a second switch housing that is suitable for use in a key mechanism.
Figure 7:
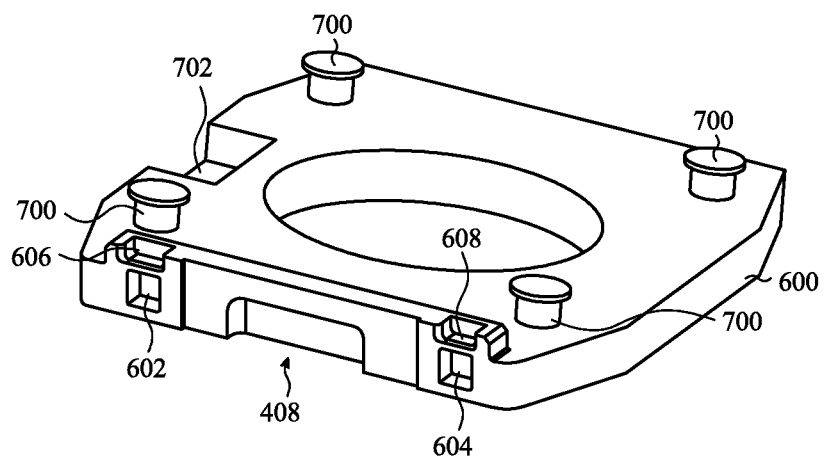
FIG. 7 depicts a bottom view of the second switch housing.

Referring now to FIGS. 6 and 7, a second switch housing that is suitable for use in a key mechanism is shown. FIG. 6 depicts a top view of the second switch housing and FIG. 7 illustrates a bottom view of the second switch housing. The switch pin retaining mechanisms 602, 604 secure the switch housing pins 306 and 310, respectively, in place and enable the switch housing pins 306, 310 to rotate freely within a respective switch pin retaining mechanism 602, 604 when the hinged structure 218 is attached to the switch housing 600. Similarly, the switch pin retaining mechanism 408 secures the switch housing pins 304 and 308 in place and enables the switch housing pins 304, 308 to move (e.g., slide and/or raise and lower) freely within the switch pin retaining mechanism 408 when the hinged structure 218 is attached to the switch housing 600.

In the illustrated embodiments, the switch pin retaining mechanisms 408, 602, 604 are configured as cutouts within the switch housing 600 at locations that correspond to respective switch housing pins 304, 306, 308, 310. In one embodiment, the switch pin retaining mechanisms 408, 602, 604 are formed in opposing sides of the switch housing 600.

In some embodiments, the lead-in cutouts 606 and 608 adjacent the switch pin retaining mechanism 602 and 604, respectively, can make it easier to insert the switch housing pins 306 and 310 into the switch pin retaining mechanisms 602 and 604. The lead-in cutouts 606, 608 are configured as cutouts within the switch housing 600 at locations that correspond to respective switch housing pins 306, 310. The lead-in cutouts 606, 608 position the switch housing pins 306, 310 at locations that correspond to the switch pin retaining mechanisms 602, 604. Additionally, the lead-in cutouts 606, 608 reduce the thickness of the switch housing 600 below the switch pin retaining mechanisms 602, 604, which can make it easier to insert the switch housing pins 306, 310 into the switch pin retaining mechanisms 602, 604.

Additionally, in some embodiments the switch housing 600 (and the switch housing 212 in FIG. 2) can include legs 700 and a cutout 702. In one embodiment, the legs 700 may attach to the membrane layer 204 (see FIG. 2). In another embodiment, the legs 700 can extend into openings (not shown) in the membrane layer 204 and the adhesive layer 210 to attach to the substrate 200 (see FIG. 2). The cutout 702 may be included in the switch housing 600 and/or 212 to distribute and/or disperse light emitted by the light source 202 (see FIG. 2).

In the embodiments shown in FIGS. 6 and 7, the hinged structure 218 can be pre-installed in the switch housing 600 (from the bottom side of the switch housing) prior to fabrication of the keyboard assembly 102. This is described in more detail in conjunction with FIG. 10. As discussed earlier, the lead-in cutouts 606 and 608 can make it easier to insert the switch housing pins 306 and 310 into the switch pin retaining mechanisms 602 and 604 when the hinged structure 218 is installed from the bottom side of the switch housing 600. The combined hinged structure 218 and switch housing 600 can then be attached to the membrane layer 204 or to the substrate 200.

Figure 8:
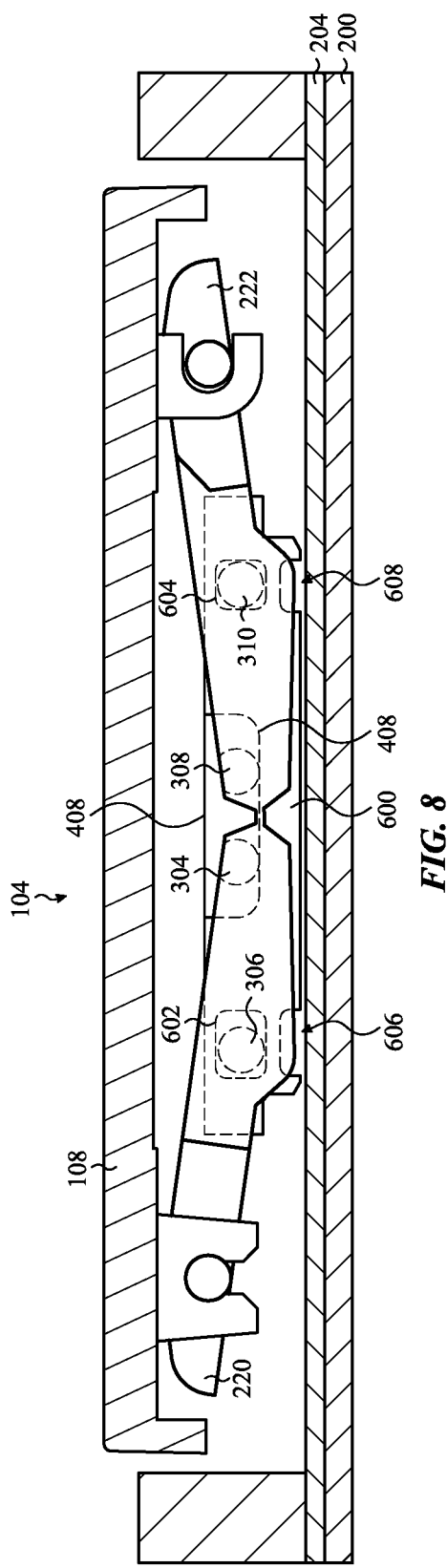
FIG. 8 illustrates a side view of a key mechanism depicting the attachment of the hinged structure to the switch housing shown in FIG. 6.

FIG. 8 illustrates a side view of a key mechanism depicting the attachment of the hinged structure to the switch housing shown in FIG. 6. For clarity, other components and layers that may be included in the key mechanism, such as, for example, the adhesive layer 210, the dome switch 208, and the adhesive layer 216, are not shown in FIG. 8.

The switch pin retaining mechanisms 602 and 604 secure the switch housing pins 306 and 310, respectively, and permit the switch housing pins 306, 310 to rotate freely within the switch pin retaining mechanisms 602, 604 when the keycap 108 is depressed. The switch pin retaining mechanism 408 secures the switch housing pins 304 and 308 and enables the switch housing pins 304, 308 to move freely (e.g., slide and/or raise and lower) within the switch pin retaining mechanism 408 when the key mechanism 104 moves between the rest and the depressed positions. In a non-limiting example, the switch pin retaining mechanisms 602, 604 and the lead-in cutouts 606, 608 are each formed as a cutout in a side of the switch housing 600 at locations that correspond to the switch housing pins 306, 310. In one embodiment, the switch pin retaining mechanisms 408, 602, 604 are formed in two opposing sides of the switch housing 600.

Figure 9:
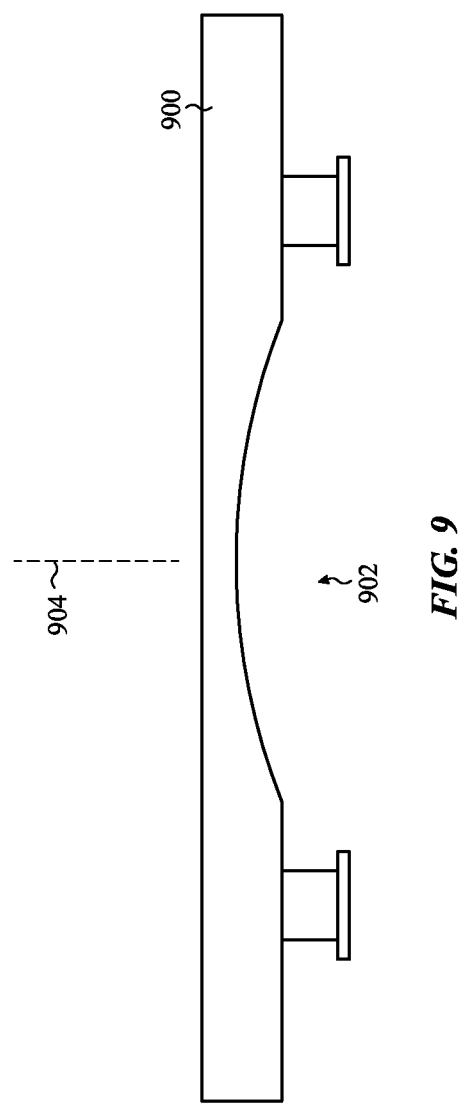
FIG. 9 depicts a side view of a flexible switch housing.

FIG. 9 depicts a side view of a flexible switch housing that is suitable for use as the switch housing 212 or the switch housing 600. A region 902 of the switch housing 900 can be narrowed or thinned to permit the switch housing 900 to bend around the center of the switch housing 900 (e.g., bend around line 904). In some embodiments, it may be easier to insert the switch housing pins 306 and 310 into the switch pin retaining mechanisms 602 and 606 with the switch housing 900 in a bended position.

Figure 10:
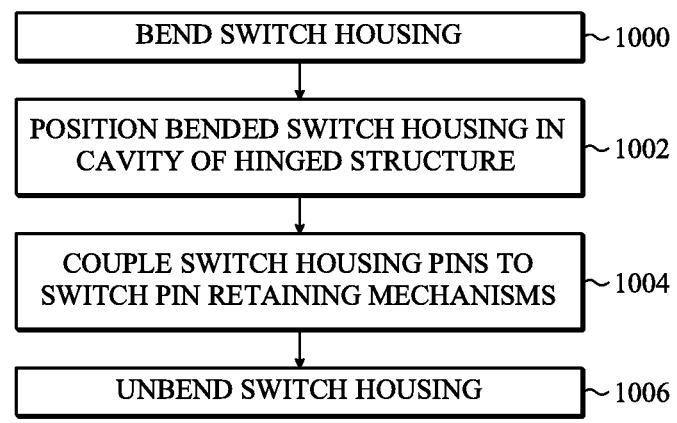
FIG. 10 shows a flowchart of a method of coupling the switch housing to the hinged structure.

In some embodiments, a method of assembling a key mechanism can include bending a flexible switch housing and positioning the bended switch housing within a cavity of a hinged structure. FIG. 10 shows a flowchart of a method of coupling the switch housing to the hinged structure. The switch housing includes switch pin retaining mechanisms and the hinged structure includes corresponding switch housing pins. As shown in blocks 1000 and 1002, the flexible switch housing is bent and the bent hinged structure is positioned in the cavity of the hinged structure. Bending the switch housing can make it easier to position the switch housing within the cavity of the hinged structure.

In the embodiment shown in FIGS. 2-5, the hinged structure can be positioned over and around the bent switch housing from the top side of the switch housing. Alternatively, in the embodiment depicted in FIGS. 6-8, the hinged structure can be positioned over and around the bent switch housing from the bottom side of the switch housing. This configuration allows the lead-in cutouts 606, 608 to assist in positioning the switch housing pins 306 and 310 into the switch pin retaining mechanisms 602, 604.

Next, as shown in block 1004, the switch housing pins on the hinged structure are coupled to the switch pin retaining mechanisms in the switch housing. The bent switch housing may make it easier to couple the switch housing pins to the switch pin retaining mechanisms while the switch housing is positioned within the cavity. Finally, at block 1006, the bent switch housing is un-bent such that the switch housing pins on the hinged structure are retained within the switch pin retaining mechanisms in the housing. Thereafter, the switch housing can be attached to a membrane layer and/or a substrate in the key mechanism.

In some embodiments, the switch housings can be connected together when manufactured. The hinged structures may then be attached to the switch housings while the switch housings are connected. Thereafter, the switch housings can be singulated or separated from one another. Keeping the switch housings connected when attaching the hinged structures can improve the alignment of the key mechanisms in the X-Y plane.

Figure 11:
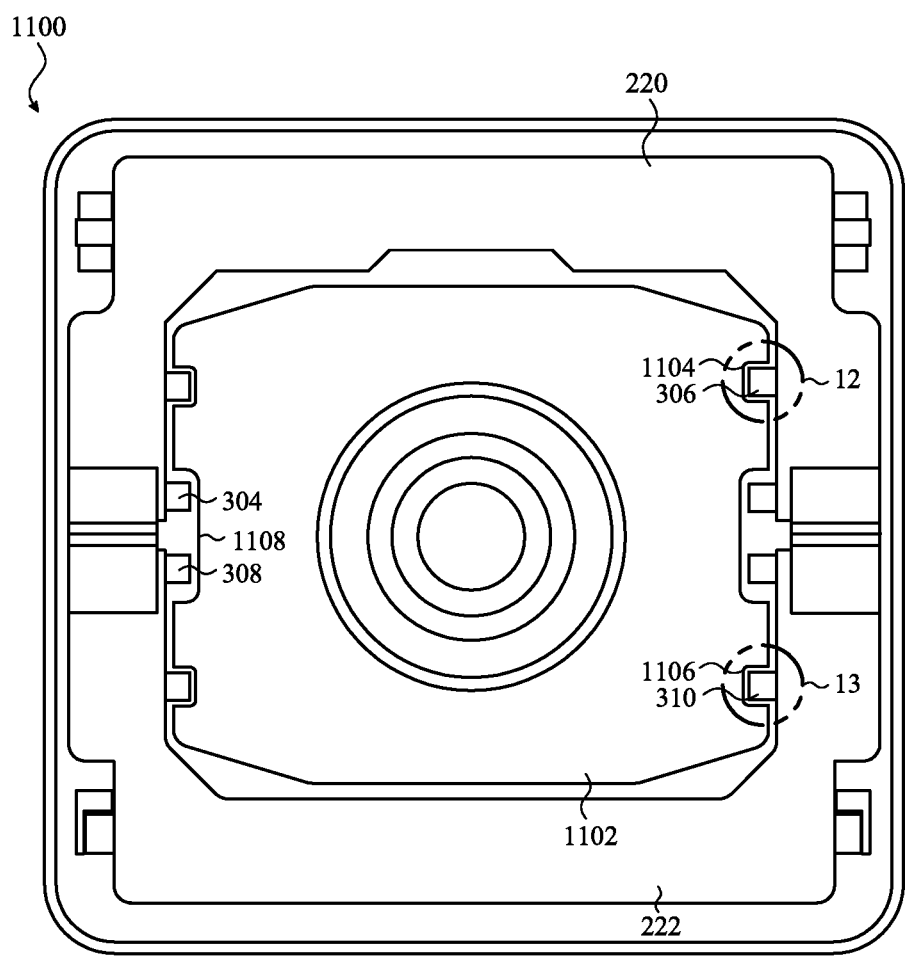
FIG. 11 illustrates a bottom view of a third key mechanism.

FIGS. 11-14 depict a third embodiment of a switch housing. FIG. 11 illustrates a bottom view of a third key mechanism showing the hinged structure. The key mechanism 1100 is similar to the key mechanism shown in FIG. 3 except for the switch housing 1102. The switch housing 1102 includes two U-shaped switch pin retaining mechanisms 1104, 1106 that retain the switch housing pins 306 and 310, respectively. A cutout 1108 in the switch housing 1102 retains the switch housing pins 304 and 308.

Figure 12:
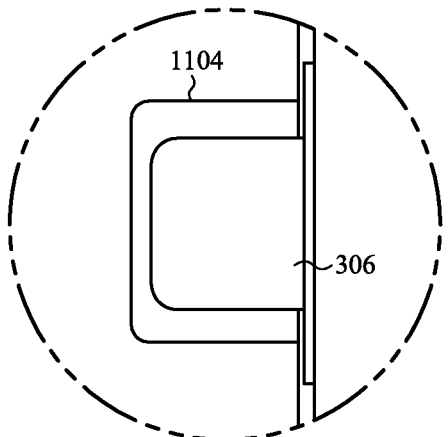
FIG. 12 depicts a top view of the switch pin retaining mechanism in FIG. 11.
Figure 13:
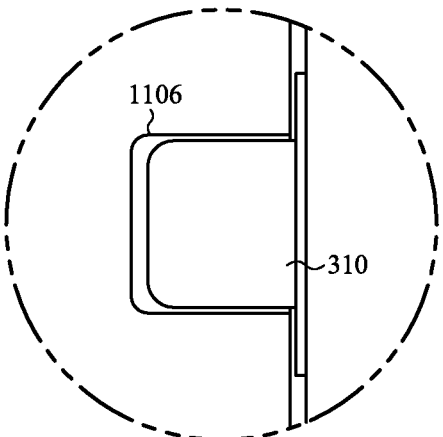
FIG. 13 illustrates a side view of the switch pin retaining mechanism in FIG. 11.
Figure 14:
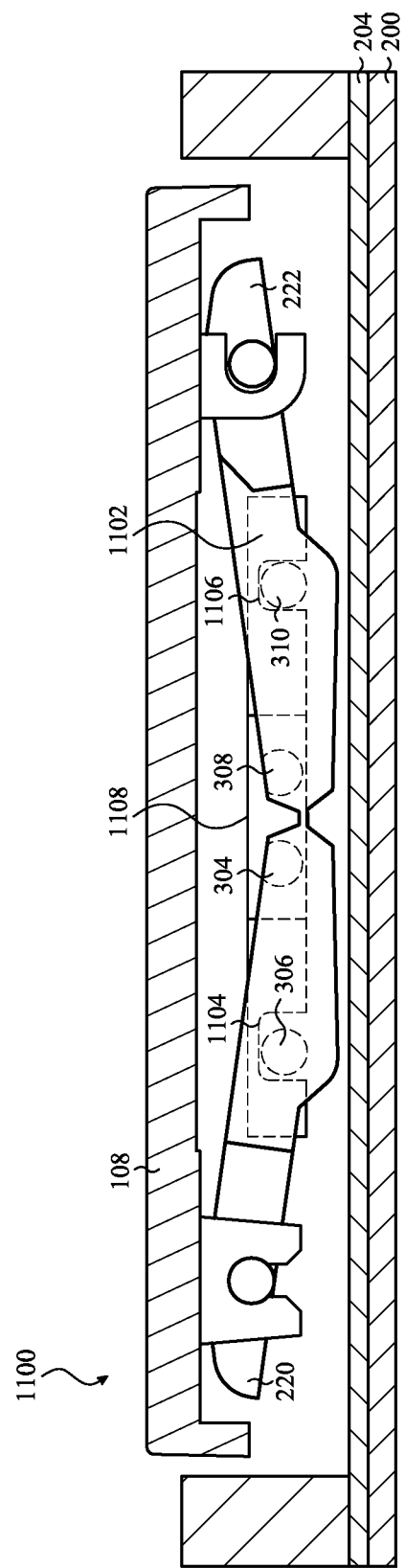
FIG. 14 depicts a side view illustrating the attachment of the hinged structure to the switch housing shown in FIG. 11.

FIGS. 12 and 13 depict top views of the switch pin retaining mechanisms 1104 and 1106, respectively. FIG. 14 depicts a side view illustrating the attachment of the hinged structure to the switch housing shown in FIG. 11. For clarity, other components and layers that may be included in the key mechanism, such as, for example, the adhesive layer 210, the dome switch 208, and the adhesive layer 216, are not shown in FIG. 14.

Referring to FIGS. 11-14, the U-shaped switch pin retaining mechanism 1104 may be wider than the U-shaped switch pin retaining mechanism 1106 to permit the switch housing pin 306 to slide when the key mechanism 1100 moves between the rest and the depressed positions. The switch housing pin 310 is secured in and rotates within the U-shaped switch pin retaining mechanism 1106 when the key mechanism 1100 moves between the rest and the depressed positions. And the switch housing pins 304 and 308 are secured in and slide within the cutout 1108 when the key mechanism 1100 moves between the rest and the depressed positions.

In the illustrated embodiments, the switch pin retaining mechanisms 1104, 1106, 1108 are formed as cutouts in at least one side of the switch housing 1102 at a location that corresponds to a respective switch pin 304, 306, 308, 310. For example, in the illustrated embodiment the switch pin retaining mechanisms 1104, 1106, 1108 are formed as a cutout in two opposing sides of the switch housing 1102.

Figure 15:
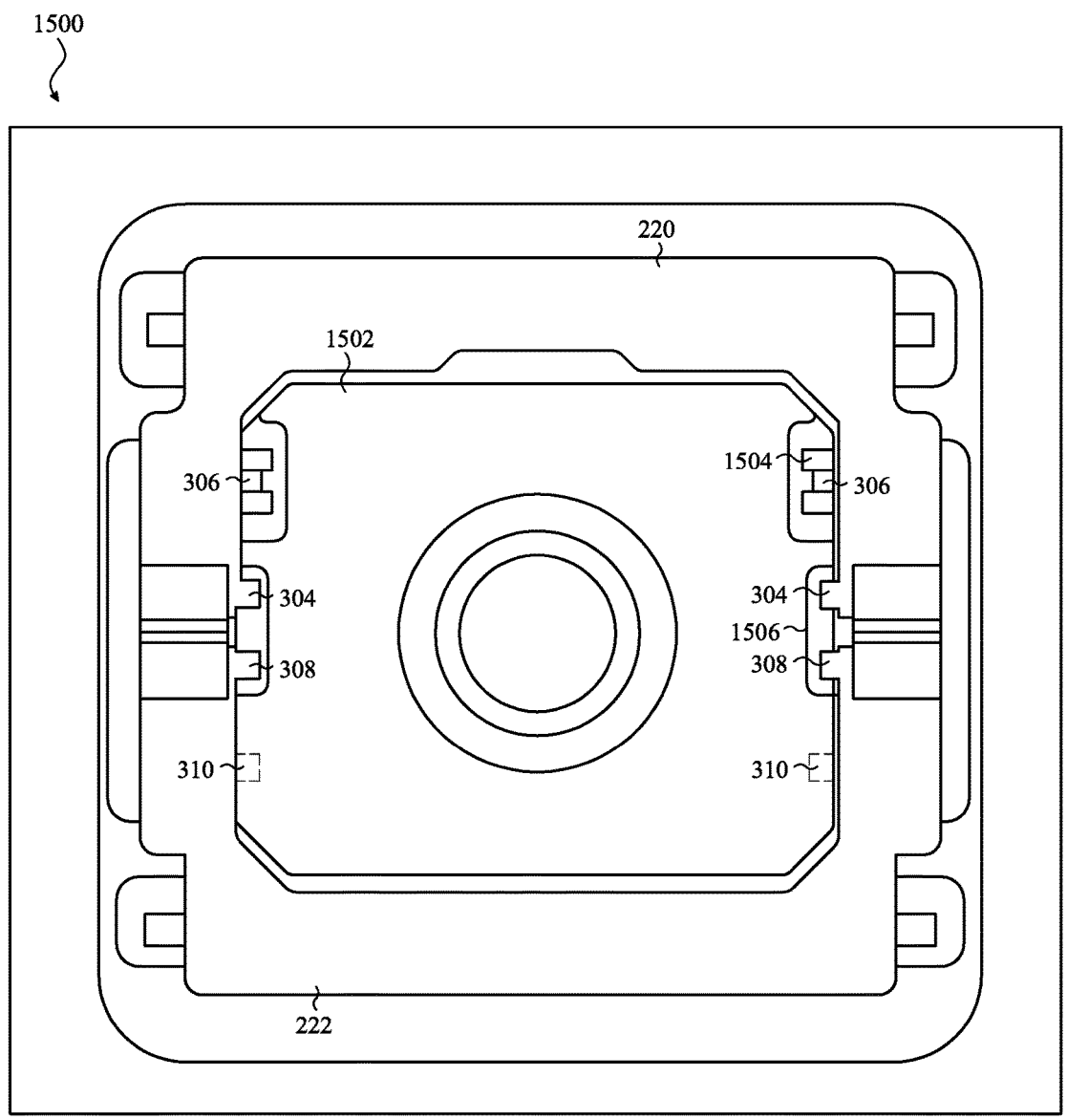
FIG. 15 illustrates a top view of a fourth key mechanism with the keycap removed.
Figure 16:
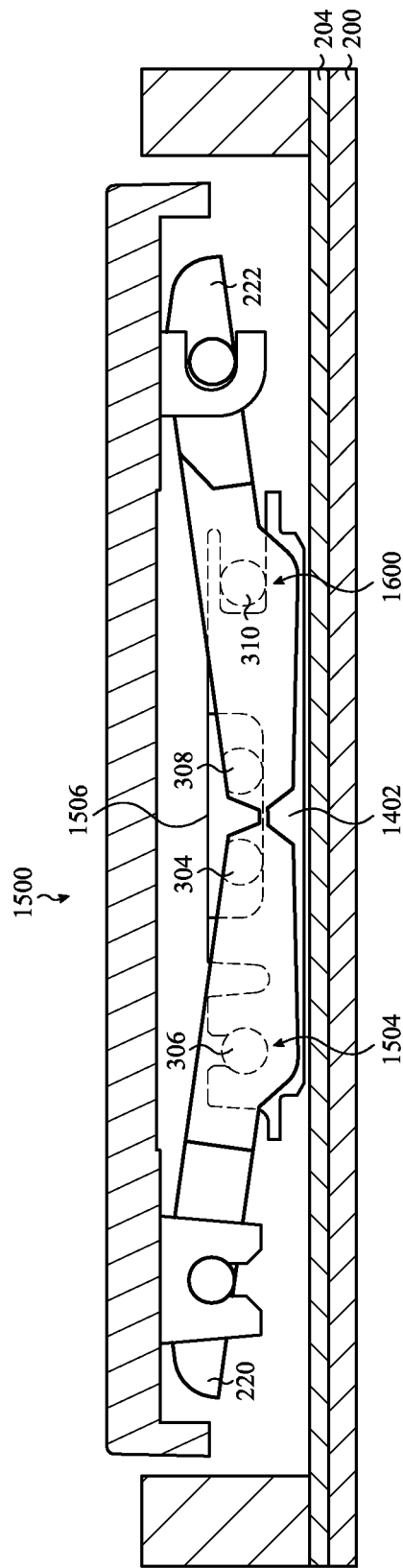
FIG. 16 depicts a side view illustrating the attachment of the hinged structure to the switch housing shown in FIG. 15.

FIGS. 15 and 16 depict a fourth embodiment of a switch housing. FIG. 15 illustrates a top view of a fourth key mechanism with the keycap removed. FIG. 16 depicts a side view illustrating the attachment of the hinged structure to the switch housing shown in FIG. 15. Other components and layers that may be included in the key mechanism, such as, for example, the adhesive layer 210, the dome switch 208, and the adhesive layer 216, are not shown in FIG. 16 for clarity.

Referring to FIGS. 15 and 16, the switch housing 1502 includes a U-shaped switch pin retaining mechanism 1504 that secures the switch housing pin 306 in place and enables the switch housing pins 306 to rotate freely in the U-shaped switch pin retaining mechanisms 1504 when the key mechanism 1500 moves between the rest and the depressed positions. The switch housing pin 310 is secured in a switch pin retaining mechanism 1600 that enables the switch housing pins 310 to slide freely within the switch pin retaining mechanism 1600 when the key mechanism 1500 moves between the rest and the depressed positions.

The switch housing 1502 can also include a cutout 1508 that permits the switch housing pins 304 and 308 to slide within the cutout 1508 when the key mechanism 1500 moves between the rest and the depressed positions. In a non-limiting example, each switch pin retaining mechanism 1504, 1508, 1600 is formed as a cutout in at least one side of the switch housing 1502 at a location that corresponds to a respective switch pin 304, 306, 308, 310. In one embodiment, the switch pin retaining mechanisms 1504, 1508, 1600 are formed in opposing sides of the switch housing 1502.

Figure 17:
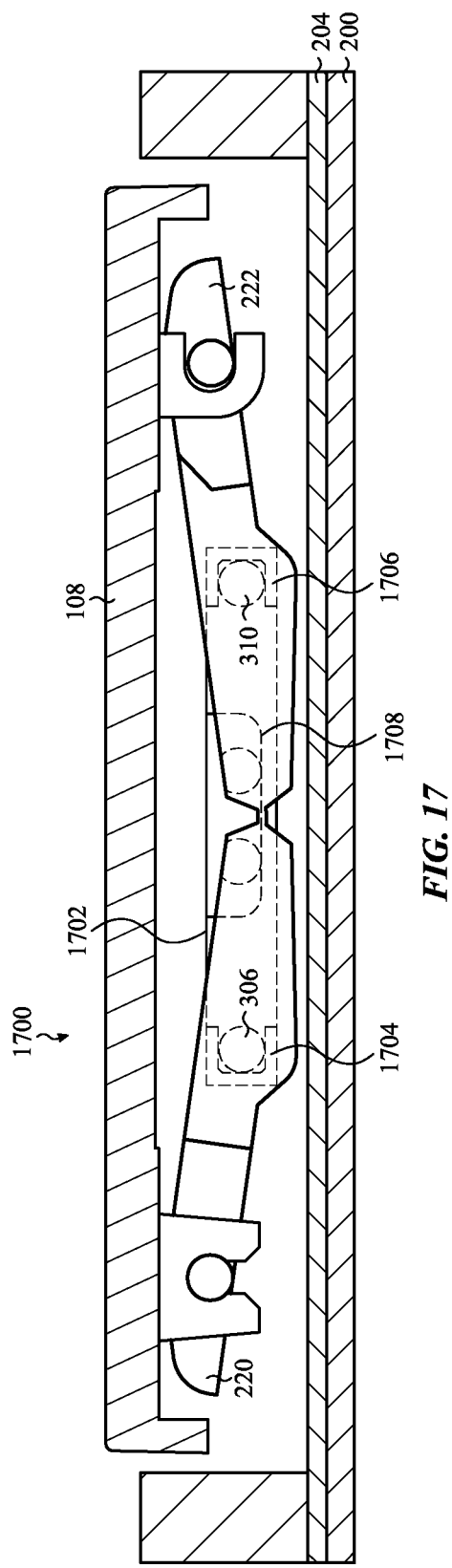
FIG. 17 illustrates a fifth embodiment of a switch housing.
Figure 18:
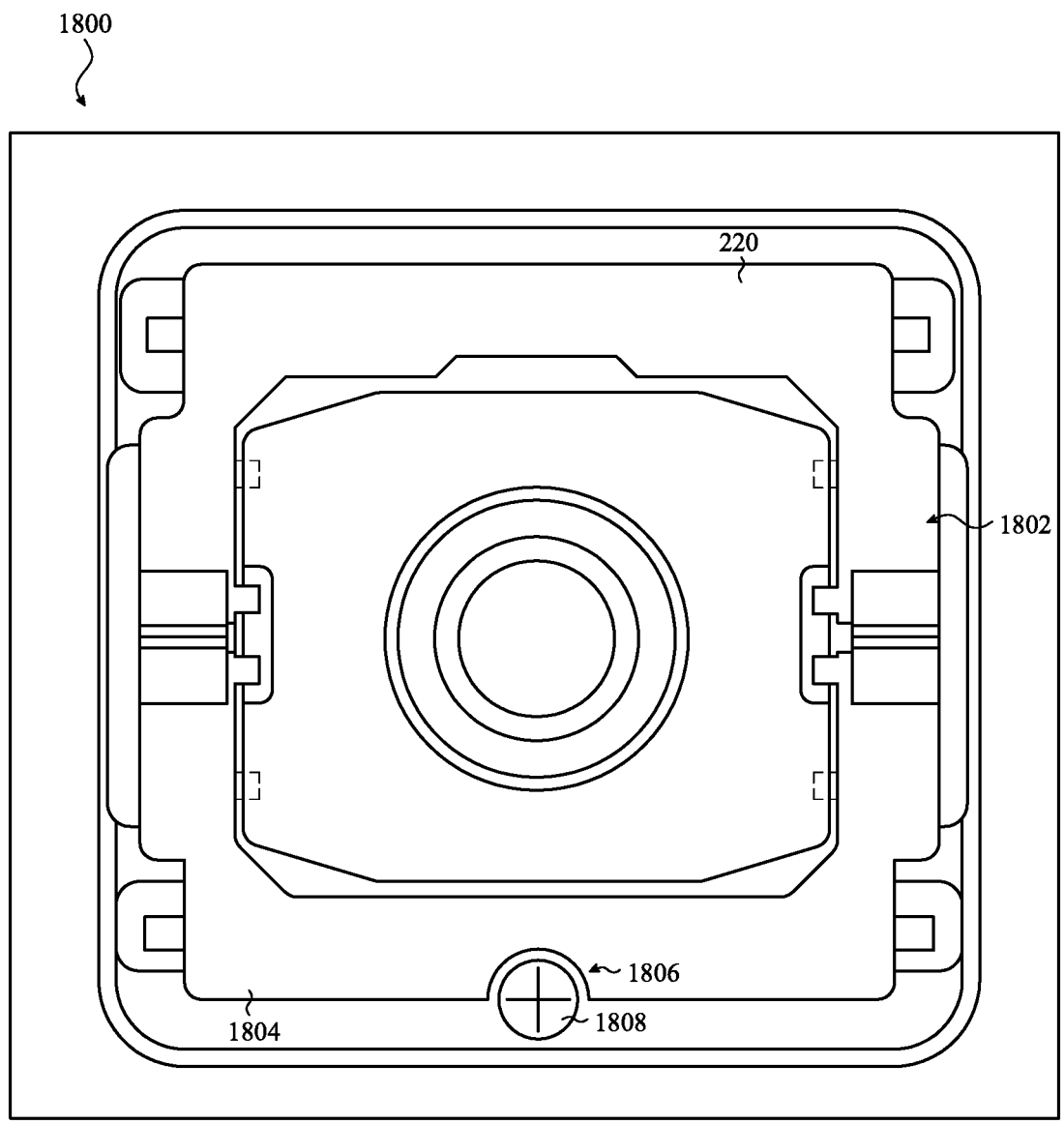
FIG. 18 depicts a top view of a key mechanism with the keycap removed to show a second example of a hinged structure.

FIG. 17 illustrates a fifth embodiment of a switch housing. The key mechanism 1700 and the switch housing 1702 shown in FIG. 17 can be similar to the embodiment shown in FIG. 14 except for the switch pin retaining mechanisms 1704, 1706. The U-shaped switch pin retaining mechanisms 1704, 1706 are positioned such that the openings in the switch pin retaining mechanisms 1704, 1706 face each other. In one embodiment, a switch housing pin (e.g., 310) is secured in place by and rotates freely within one U-shaped switch pin retaining mechanism (e.g., 1706) and the other switch housing pin (e.g., 306) is secured in place by and slides freely within the other switch pin retaining mechanism (e.g., 1704). In other embodiments, both switch housing pins 306, 310 can slide within the switch pin retaining mechanisms 1704, 1706 when the key mechanism 1700 moves between the rest and the depressed positions.

The switch housing 1702 can also include a cutout 1708 that secures the switch housing pins 304, 308 and enables the switch housing pins 304 and 308 to move freely (e.g., slide and/or raise and lower) within the cutout 1708 when the key mechanism 1700 moves between the rest and the depressed positions. In a non-limiting example, each switch pin retaining mechanism 1704, 1706, 1708 is formed as a cutout in at least one side of the switch housing 1702 at a location that corresponds to a respective switch pin 304, 306, 308, 310. In one embodiment, the switch pin retaining mechanisms 1704, 1706, 1708 are formed in opposing sides of the switch housing 1702.

When the hinged structure 218 is attached to the switch housing 1702 in the embodiment of FIG. 17, the hinged structure 218 can be held in a folded position such that the outer ends of the two wings 220, 222 are near each other. The hinged end of the folded hinged structure 218 may then be inserted into the cutout 1708 between the switch pin retaining mechanisms 1704, 1706 and the switch housing pins 306, 310 aligned with the openings in the switch pin retaining mechanisms 1704, 1706. This also positions the switch housing pins 304, 308 in the cutout 1708 of the switch housing 1702. The hinged structure 218 can then be released from the folded position, allowing the hinged structure 218 to unfold and the switch housing pins 306, 310 to slide into the openings in the switch pin retaining mechanisms 1704, 1706.

In some embodiments, fasteners such as screws are used to attach the substrate (e.g., PCB) to the enclosure of an electronic device. For example, the fasteners can be inserted or screwed into openings in the bottom surface of the enclosure and extend into the interior of the enclosure and attach to the substrate. In another embodiment, the fasteners may be inserted or screwed into openings in the substrate and extend into and attach to the bottom surface of the enclosure. In such an embodiment, the fasteners can be positioned below the key mechanisms in the keyboard assembly. The key mechanism 1800 shown in FIG. 18 can be used in embodiments that position fasteners below the key mechanisms.

The hinged structure 1802 includes two wings 220 and 1804. Wing 1804 includes a cutout 1806 that can extend around a fastener 1808. The fastener 1808 is shown as a screw, but other types of fasteners can be used. The cutout 1806 can accommodate the fastener 1808 and allow the fastener 1808 to be inserted and removed without removing or damaging the wing 1804 and/or the hinged structure 1802.

Figure 19:
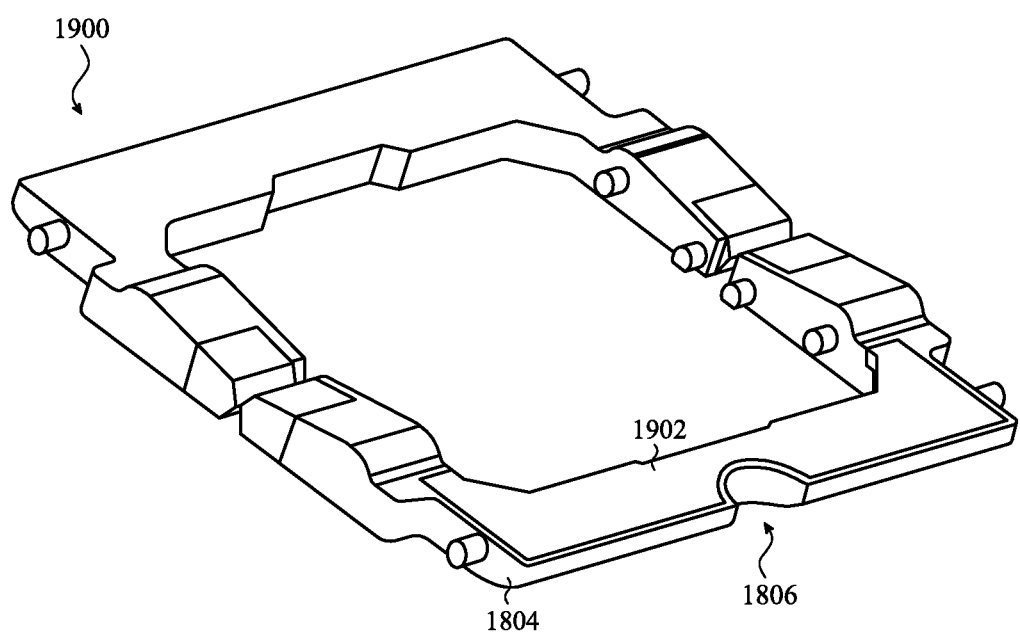
FIG. 19 depicts a third example of a hinged structure that is suitable for use in a key mechanism.

In some embodiments, a hinged structure 1900 can include a stiffener or support plate 1902 (see FIG. 19). The support plate is attached to the top surface of the portion of the wing 1804 adjacent the cutout 1806 (see FIG. 19). The support plate 1902 can provide support and strengthen the portion of the wing 1804 adjacent the cutout 1806. The support plate 1902 may be attached to the wing 1804 using any suitable attachment mechanism. For example, in one embodiment an adhesive can be used to attach the support plate 1902 to the wing 1804.

Figure 20:
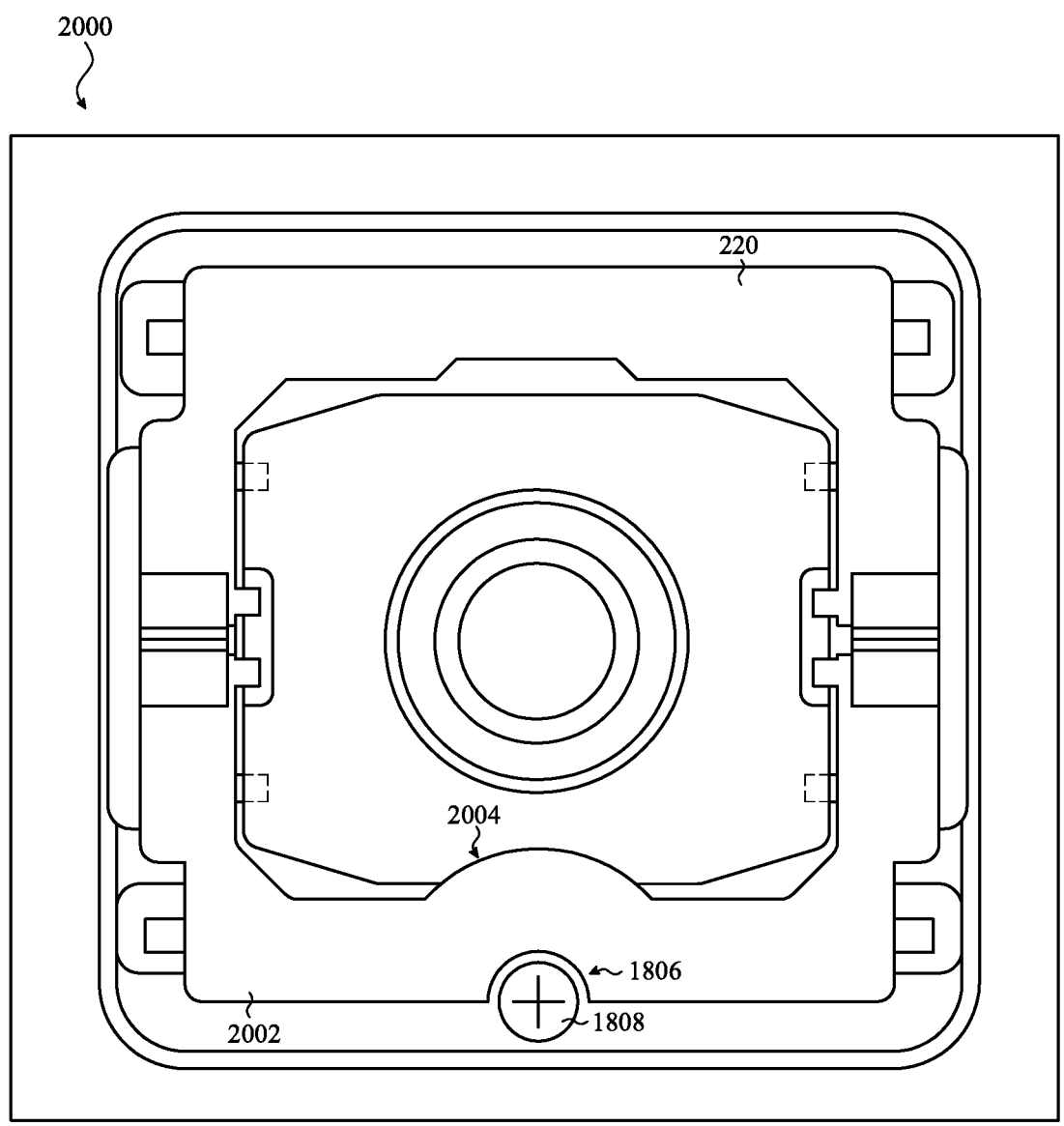
FIG. 20 depicts a fourth example of a hinged structure that is suitable for use in a key mechanism.

Additionally or alternatively, as shown in FIG. 20, a hinged structure 2000 that includes a cutout 1806 in a wing 2002 can extend the wing portion (see 2004) around or adjacent to the cutout 1806. The projection 2004 of the wing 2002 may extend into the cavity of the hinged structure 2000. The projection 2004 can increase the strength of the wing 2002.

In embodiments that include the cutout 1806, a shield can be positioned over or adjacent the cutout. For example, a pattern of apertures or cuts can be positioned in structures over, within, and/or around the cutout 1806. In some embodiments, the pattern of cuts can prevent contaminants, such as a liquid, from entering into the key mechanism and/or the keyboard assembly. For example, in some embodiments the tension in the cuts or apertures can be sufficiently high to prevent a liquid from entering the cutout 1806.

In some embodiments, the substrate 200 may act as a mechanism that retains the switch housing (e.g., 212) and the hinged structure 218 within the key mechanism (e.g., 104) and the keyboard assembly 102.

In some embodiments, a switch pin retaining mechanism that permits the switch housing pin to rotate is directly below a keycap retaining mechanism that allows the keycap pin to slide. This can increase the retention force of the attachment between the switch housing and the hinged structure.

Although the switch pin retaining mechanisms have been described as cutouts formed in a side of the switch housing, other embodiments can form the switch pin retaining mechanisms differently. For example, other embodiments can form the switch pin retaining mechanisms differently. For example, a loop or a hook that is formed in or on the switch housing, or attached to the switch housing, may be used as a switch pin retaining mechanism.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A key mechanism, comprising:
a keycap;
a switch housing positioned below the keycap and over a substrate and configured to distribute light to an underside of the keycap, the switch housing defining switch pin retaining features on opposing sides of the switch housing and an opening extending between a first surface of the switch housing and a second surface of the switch housing;
a switch positioned in the opening of the switch housing; and
a hinged structure supporting the keycap and coupled to the switch pin retaining features by corresponding switch housing pins, the hinged structure enabling the keycap to move relative to the substrate between an undepressed position and a depressed position;
wherein one of the switch housing pins moves vertically within the corresponding switch pin retaining feature as the keycap transitions between the undepressed position and the depressed position.

2. The key mechanism of claim 1, wherein:
a light source is positioned on the substrate below the keycap; and
the switch housing is optically coupled to the light source.

3. The key mechanism of claim 1, wherein the switch housing is optically transparent.

4. The key mechanism of claim 1, wherein:
a light source is positioned on the substrate below the keycap;
the switch housing further defines a cutout; and
the light source is at least partially positioned within the cutout of the switch housing.

5. The key mechanism of claim 1, wherein:
the switch pin retaining features comprise multiple switch pin retaining features on each of a first side and an opposing second side of the switch housing; and
each switch pin retaining feature defines a cutout in a respective side of the switch housing.

6. The key mechanism of claim 1, wherein the hinged structure comprises:
a pair of wings positioned adjacent to each other such that a cavity is formed between the pair of wings, wherein the switch housing is positioned in the cavity; and
at least one coupling element coupling corresponding arms of the pair of wings and enabling the pair of wings to pivot as the coupling element bends,
wherein the switch housing pins are positioned on the wings and extend into the cavity.

7. The key mechanism of claim 6, wherein the pair of wings are formed from a first material and the coupling element is formed from a second, different material.

8. The key mechanism of claim 7, wherein at least a portion of each coupling element is formed from a fabric material.

9. An keyboard comprising:
a keyboard substrate;
a light source positioned on the keyboard substrate;
a keycap;
a switch housing positioned between the keycap and the keyboard substrate and formed of an optically transparent material, the switch housing defining switch pin retaining features on opposing sides of the switch housing and defining a cutout such that the switch housing at least partially surrounds the light source, the switch housing further defining an opening extending between a first surface of the switch housing and a second surface of the switch housing;
a switch positioned in the opening of the switch housing; and
a hinged structure supporting the keycap and coupled to the switch pin retaining features by corresponding switch housing pins, the hinged structure enabling the keycap to move relative to the keyboard substrate between an undepressed position and a depressed position;
wherein one of the switch housing pins moves vertically within the corresponding switch pin retaining feature as the keycap transitions between the undepressed position and the depressed position.

10. The keyboard of claim 9, wherein the switch housing is configured to distribute light emitted by the light source to an underside of the keycap.

11. The keyboard of claim 9, wherein the light source is optically coupled to the switch housing at an interface within the cutout.

12. The keyboard of claim 9, wherein the switch housing optically couples the keycap and the light source such that the keycap is illuminated by light emitted by the light source.

13. An electronic device comprising:
an enclosure;
a keyboard substrate within the enclosure;
a light source positioned on the keyboard substrate; and
a key mechanism positioned at least partially within the enclosure, the key mechanism comprising:
a keycap;
a switch housing positioned between the keycap and the keyboard substrate and configured to distribute light emitted by the light source to the keycap, the switch housing defining a set of switch pin retaining features on opposing sides of the switch housing and an opening extending from a first surface of the switch housing to a second surface of the switch housing;

a switch positioned in the opening of the switch housing; and a hinged structure having multiple switch housing pins, wherein two of the multiple switch housing pins are received by a common switch pin retaining feature of the set of switch pin retaining features.

14. The electronic device of claim 13, wherein the switch housing is at least partially formed of an optically transparent material.

15. The electronic device of claim 13, wherein the light source is a light emitting diode (LED).

16. The electronic device of claim 13, wherein:

the switch pin retaining features comprise multiple switch pin retaining features on each of two opposing sides of the switch housing; and at least one switch pin retaining feature on each side of the switch housing comprises a U-shaped pin retaining feature that includes an opening that faces another switch pin retaining feature on a same side of the switch housing.

17. The electronic device of claim 13, wherein the switch housing further defines a cutout; and the light source is positioned within the cutout.

18. The electronic device of claim 17, wherein the cutout is positioned in a peripheral edge of the switch housing.

19. The electronic device of claim 13, wherein the hinged structure comprises:

a pair of wings flexibly coupled to each other by coupling elements, wherein:

the pair of wings define a cavity;

the switch housing is positioned within the cavity; and each wing of the pair of wings includes a housing pin that extends inward toward the cavity.

20. The electronic device of claim 19, wherein:

each wing of the pair of wings includes a keycap pin extending outward from the pair of wings;

the keycap includes keycap pin retaining features that are coupled to the keycap pins; and the electronic device further comprises:

a membrane layer attached to the keyboard substrate; and a dome switch coupled to the membrane layer and positioned in the cavity of the hinged structure.

* * * * *